United States Patent
Yamada et al.

(10) Patent No.: US 7,467,998 B2
(45) Date of Patent: Dec. 23, 2008

(54) PUZZLE GAME APPARATUS, STORAGE MEDIUM STORING PUZZLE GAME PROGRAM, AND PUZZLE GAME CONTROLLING METHOD

(75) Inventors: Yoichi Yamada, Kyoto (JP); Minoru Narita, Kyoto (JP)

(73) Assignee: Nintendo Co., Ltd., Kyoto-shi (JP)

( * ) Notice: Subject to any disclaimer, the term of this patent is extended or adjusted under 35 U.S.C. 154(b) by 321 days.

(21) Appl. No.: 11/099,523

(22) Filed: Apr. 6, 2005

(65) Prior Publication Data

US 2005/0233793 A1   Oct. 20, 2005

(30) Foreign Application Priority Data

Apr. 16, 2004   (JP)   ............................ 2004-120974

(51) Int. Cl.
*A63F 13/00*   (2006.01)
(52) U.S. Cl. .......................................... 463/9
(58) Field of Classification Search .............. 463/9
See application file for complete search history.

(56) References Cited

U.S. PATENT DOCUMENTS

| | | | |
|---|---|---|---|
| 6,267,676 B1 * | 7/2001 | Nagaoka | ...................... 463/43 |
| 6,326,963 B1 | 12/2001 | Meehan | |
| 2003/0109305 A1 | 6/2003 | Gavin et al. | |
| 2004/0038739 A1 | 2/2004 | Wanat | |
| 2004/0259637 A1 * | 12/2004 | Kimura et al. | ................. 463/31 |

FOREIGN PATENT DOCUMENTS

JP   2002-224435   8/2002

OTHER PUBLICATIONS

Ltd and Psygnosis Ltd, Lemmings Revolution, Copyright 2000, Take 2 Interactive, pp. 4-12.*
TerraCresta guide book for perfect work-through, publisher: Osamu Okamura, published by Tokuma Communications Co. Ltd., on Nov. 1, 1986, on p. 4-5 and p. 22-23.
King's Knight guide book for perfect work-through, publisher: Naomichi Doi, published by Asuka Shinsya Co. Ltd., on Nov. 9, 1986, on p. 6 and 60-61.
Pottinger "Coordinated Unit Movement", Game Developer Magazine, Online!, San Francisco, http://www.gamasutra.com/features/1999/0122/1.htm, Jan. 22, 1999, 15 pages.

(Continued)

*Primary Examiner*—John M Hotaling, II
*Assistant Examiner*—Malina Dhillon
(74) *Attorney, Agent, or Firm*—Nixon & Vanderhye, P.C.

(57) ABSTRACT

A puzzle image to be solved, and a duplicating block for creating a duplicate character as a copy of a player character are displayed. The duplicate character is, on the basis of at least a fact that the player character is superposed on the duplicating block, generated in the superposed position. A time limit is set for displaying the duplicate character. Then, when a formation or an arrangement pattern formed by the generated duplicate character and the player character satisfies a predetermined condition indicated by the puzzle image, a change, such as displaying an image of movement of a block or opening of a door, for example, is applied to progress of the game.

14 Claims, 14 Drawing Sheets

OTHER PUBLICATIONS

Pottinger "Implementing Coordinated Movement", Game Developer Magazine, Online!, San Francisco, http://www.gamasutra.com/features/1999/0129/imlementing_01.htm, Jan. 29, 1999, 14 pages.

The Legend of Zelda Capture Scripture Series No. 2 "The Legend of Zelda: Majora's Mask", Japan Media Factory Inc., 1st version, pp. 86-87 and 90 (Jun. 13, 2000).

The May issue of Dengaki Game Cube, Japan Media Works Inc., accepted in NCIPI in JPO on Mar. 31, 2004, pp. 10-33.

Blinx The Time Sweeper, Cool Master Guide, Japan Softbank Publishing Inc., 1st version, Dec. 24, 2002, pp. 014-048.

* cited by examiner

PUZZLE GAME APPARATUS, STORAGE MEDIUM STORING PUZZLE GAME PROGRAM, AND PUZZLE GAME CONTROLLING METHOD

FIELD

The illustrative embodiments relate to a puzzle game apparatus, a storage medium storing a puzzle game program, and a puzzle game controlling method. More specifically, the illustrative embodiments relate to a puzzle game apparatus, a storage medium storing a puzzle game program, and a puzzle game controlling method for solving a puzzle by tactically generating and arranging a duplicate of a player character.

BACKGROUND AND SUMMARY

A game capable of advantageously advancing the game play by adding a double or an additional character to the player character to be operated by the player is known. In the Literature 1 ("TerraCresta guide book for perfect workthrough", publisher: Osamu Okamura, published by TOKUMA COMMUNICATIONS Co. Ltd., on Nov. 1, 1986, on page 4-5 and page 22-23), a shooting game for playing the game while acquiring an unit part is disclosed. In this game, the player can power-up his/her own machine by acquiring a unit part, and can defeat an enemy by making a formation with the unit part to shoot in a wide range.

Furthermore in the Literature 2 ("King's Knight guide book for perfect work-through", publisher: Naomichi Doi, published by ASUKA SHINSYA Co. Ltd., on Nov. 9, 1986, on page 6 and 60-61), an action game for playing the game in a state where four characters make a predetermined formation is disclosed. Although the player cannot change the shape of the formation, he can change an arrangement position of the characters in the fixed formation. For this purpose, the player has to pick up a tile with a different mark in correspondence to a changing method of the arrangement position. That is, the player plays a game by picking up an optimal tile corresponding to a game condition and the arrangement of a desired character to a specific position.

On the other hand, although a double or an additional character is not added, one example of a game in which a task is set that is capable of being solved when a plurality of player characters are simultaneously operated is disclosed in the Literature 3 (Japanese Patent Laying-open No. 2002-224435). In the Literature 3, in order to make a plurality of player characters operable with one controller, each of a plurality of direction levers and a plurality of switches provided on the controller are assigned to each of the player characters for operation. The player has to move the plurality of player characters individually or simultaneously by operating the direction lever, etc. for each player character and thereby to put each character on one of a plurality of switches on the floor for opening the door.

In order to play the game in both of the literature 1 and the literature 2, the duplicate and the formation may have to be utilized. A way of creating a duplicate and creating a formation itself, however, is not an element of the progress of the game.

On the other hand, in the literature 3, a task capable of being solved on the basis of a fact that a plurality of player characters are operated is set, and therefore, for solving the task, the player has to separately operate the plurality of player characters, causing a problem of operability. Furthermore, the art of the literature 3 does not teach utilizing a duplicate and a formation, and therefore, a way of creating the duplicate and creating the formation itself is not the element of the game.

The illustrative implementations provide a novel puzzle game apparatus, storage medium storing a puzzle game program, and puzzle game controlling method.

One illustrative embodiment provides a puzzle game apparatus, a storage medium storing a puzzle game program, and a puzzle game controlling method that completes the puzzle to change the progress of the game when a duplicate of a player character is created and arranged such that the duplicate character and the player character satisfy a predetermined condition.

A further illustrative embodiment provides a puzzle game apparatus, a storage medium storing a puzzle game program, and a puzzle game controlling method that allow creation of a duplicate of the player character using a novel action.

An exemplary puzzle game apparatus is a puzzle game apparatus provided with an operating means, a display means, a player character display controlling means, a puzzle display controlling means, a duplicate character generating means, a duplicate character display controlling means, a puzzle solution determining means, and a progress changing means. The operating means is for performing a game operation by a player. The display means is for displaying a game image. The player character display controlling means displays a player character to be operated by the player on the display means in response to an input from the operating means. The puzzle display controlling means displays on the display means a puzzle image indicative of a predetermined condition to be solved. The duplicate character generating means generates a duplicate character as a copy of the player character on the basis of at least a fact that the player character exists in a predetermined position within a game field. The duplicate character display controlling means displays the duplicate character arranged in association with the player character on the display means while keeping a relative positional relationship between the player character and the duplicate character at when being generated by the duplicate character generating means. The puzzle solution determining means determines whether or not an arrangement pattern of the player character and the duplicate character satisfies the predetermined condition indicated by the puzzle image. The progress changing means changes progress of the game when the puzzle solution determining means determines that the predetermined condition is satisfied.

More specifically, the exemplary puzzle game apparatus (10: reference numerals are presented for illustrative purposes only) includes the operating means (20) for performing the game operation by the player and the display means (18) for displaying the game image. The player character display controlling means (30, 68, S5, S43, S111) displays the player character (100) to be operated by the player on the display means in response to the input from the operating means. The puzzle display controlling means (30, 76, S1) displays the puzzle image (108, 110) indicative of the predetermined condition to be solved. The duplicate character generating means (30, 72, S15, S17, S37, S49, S115) generates the duplicate character (104) as a copy of the player character on the basis of at least the fact that the player character exists in the predetermined position within the game field. The duplicate character display controlling means (30, 74, S9) displays the duplicate character arranged in association with the player character on the display means while keeping the relative positional relationship between the player character and the duplicate character at a time of being generated by the duplicate character generating means. The puzzle solution determining means (30, 78, S19, S21) determines whether or not the arrangement pattern of the player character and the duplicate character satisfies the predetermined condition indicated by the puzzle image. The progress changing means (30, 80, S69, S89) changes the progress of the game when the puzzle solution determining means determines that the predetermined condition is satisfied.

Accordingly, when the arrangement pattern of the generated duplicate character and the player character satisfies the predetermined condition indicated by the puzzle image, the puzzle is solved to allow the progress of the game to be changed. Therefore, the player is required to tactically create the duplicate character so as to be fitted into the puzzle image and arrange it in association with the player character.

The duplicate character display controlling means may cause the displayed duplicate character to disappear when a display time of the duplicate character exceeds a predetermined time period.

Specifically, the duplicate character display controlling means (S11, S13, S39, S47) may cause the displayed duplicate character to disappear when the display time of the duplicate character exceeds the predetermined time period, and therefore, it is possible to restrict a time period for utilizing the duplicate character. Accordingly, tactics and agile play are required to solve the puzzle.

The duplicate character generating means may include a duplicating block display controlling means for displaying a duplicating block. In the duplicating block, a plurality of creating positions, capable of creating the duplicate character, are arranged in a predetermined form on the display means. Also, the block has a copy generating means for generating, on the basis of the fact that the player character is superposed on a creating position of the duplicating block, a copy of the player character in the superposed creating position.

Specifically, the duplicate character generating means includes the duplicating block display controlling means and the copy generating means. The duplicating block display controlling means (30, 70, S1) displays the duplicating block (102) where the plurality of creating positions capable of creating the duplicate character are arranged in a predetermined form on the display means. The copy generating means (30, 72, S15, S17) generates, on the basis of the fact that the player character is superposed on the creating position of the duplicating block, the copy of the player character in the superposed creating position. Accordingly, at a time of creating the duplicate character, it is necessary to precisely superpose the player character on the desired creating position of the duplicating block. The correct position can be determined by taking the arrangement pattern fitted into the predetermined condition into account.

Furthermore, the copy generating means (S31, S37) may generate the copy in the superposed creating position so as to be displayed on the display means when a predetermined input is present from the operating means in a state that the player character is superposed on the creating position. Accordingly, it is appropriate that a predetermined operation input is performed in a state that the player character is superposed on the desired creating position of the duplicating block, in order to create the double character.

The copy generating means (S107, S115, S117) may, based on the fact that the player character is superposed on a predetermined number of creating positions, generate the copy in the superposed creating positions so as to be displayed on the display means. Accordingly, when the duplicate is created, it is necessary to skillfully operate the player character so as to be superposed only in a desired number of creating positions and at a desired position out of a plurality of creating positions on the duplicating block.

An exemplary storage medium storing a puzzle game program according to an illustrative embodiment is a storage medium storing a puzzle game program that causes a game apparatus provided with an operating means for performing a game operation by a player and a display means for displaying a game image to function as a puzzle game apparatus. The puzzle game program of the storage medium causes a processor of the game apparatus to execute a player character display controlling step, a puzzle display controlling step, a duplicate character generating step, a duplicate character display controlling step, a puzzle solution determining step, and a progress changing step. The player character display controlling step displays a player character to be operated by the player on the display means in response to an input from the operating means. The puzzle display controlling step displays a puzzle image on the display means indicative of a predetermined condition to be solved. The duplicate character generating step generates a duplicate character as a copy of the player character on the basis of at least a fact that the player character exists in a predetermined position within a game field. The duplicate character display controlling step displays the duplicate character arranged in association with the player character on the display means while keeping a relative positional relationship between the player character and the duplicate character when being generated by the duplicate character generating step. The puzzle solution determining step determines whether or not an arrangement pattern of the player character and the duplicate character satisfies the predetermined condition indicated by the puzzle image. The progress changing step changes progress of the game when it is determined that the predetermined condition is satisfied by the puzzle solution determining step.

An exemplary puzzle game controlling method according to an illustrative embodiment is a puzzle game controlling method of an exemplary game apparatus provided with an operating means for a player to perform a game operation and a display means for displaying a game image to function as a puzzle game apparatus. The game controlling method includes the player character display controlling step, the puzzle display controlling step, the duplicate character generating step, the duplicate character display controlling step, the puzzle solution determining step, and the progress changing step. The player character display controlling step displays a player character to be operated by the player on the display means in response to an input from the operating means. The puzzle display controlling step displays a puzzle image on the display means, indicative of a predetermined condition to be solved. The duplicate character generating step generates a duplicate character as a copy of the player character on the basis of at least the fact that the player character exists in a predetermined position within a game field. The duplicate character display controlling step displays the duplicate character arranged in association with the player character on the display means while keeping a relative positional relationship between the player character and the duplicate character when the duplicate character is generated by the duplicate character generating step. The puzzle solution determining step determines whether or not an arrangement pattern of the player character and the duplicate character satisfies the predetermined condition indicated by the puzzle image. The progress changing step changes progress of the game when it is determined that the predetermined condition is satisfied by the puzzle solution determining step.

In an exemplary storage medium storing a puzzle game program and puzzle game controlling method, similar to the above-described puzzle game apparatus, it is possible to tactically create the duplicate character and arrange it in association with the player character, thus providing a novel puzzle game.

According to an illustrative embodiment, when an arrangement pattern of the duplicate character and the player character satisfies a predetermined condition indicated by the puzzle image, the progress of the game is changed. Therefore, the player is required to create the duplicate character so as to fit into the condition indicated by the puzzle image and arrange it in association with the player character.

Furthermore, when the duplicating block is used for creating the duplicate character, it is necessary to superpose the player character on the desired creating position of the duplicating block, thus providing a puzzle game employing a novel operation into creating the duplicate of the player character.

The above described aspects of the illustrative embodiments will become more apparent from the following detailed description of the illustrative embodiments when taken in conjunction with the accompanying drawings.

DETAILED DESCRIPTION OF THE ILLUSTRATIVE EMBODIMENTS

Figure 1:
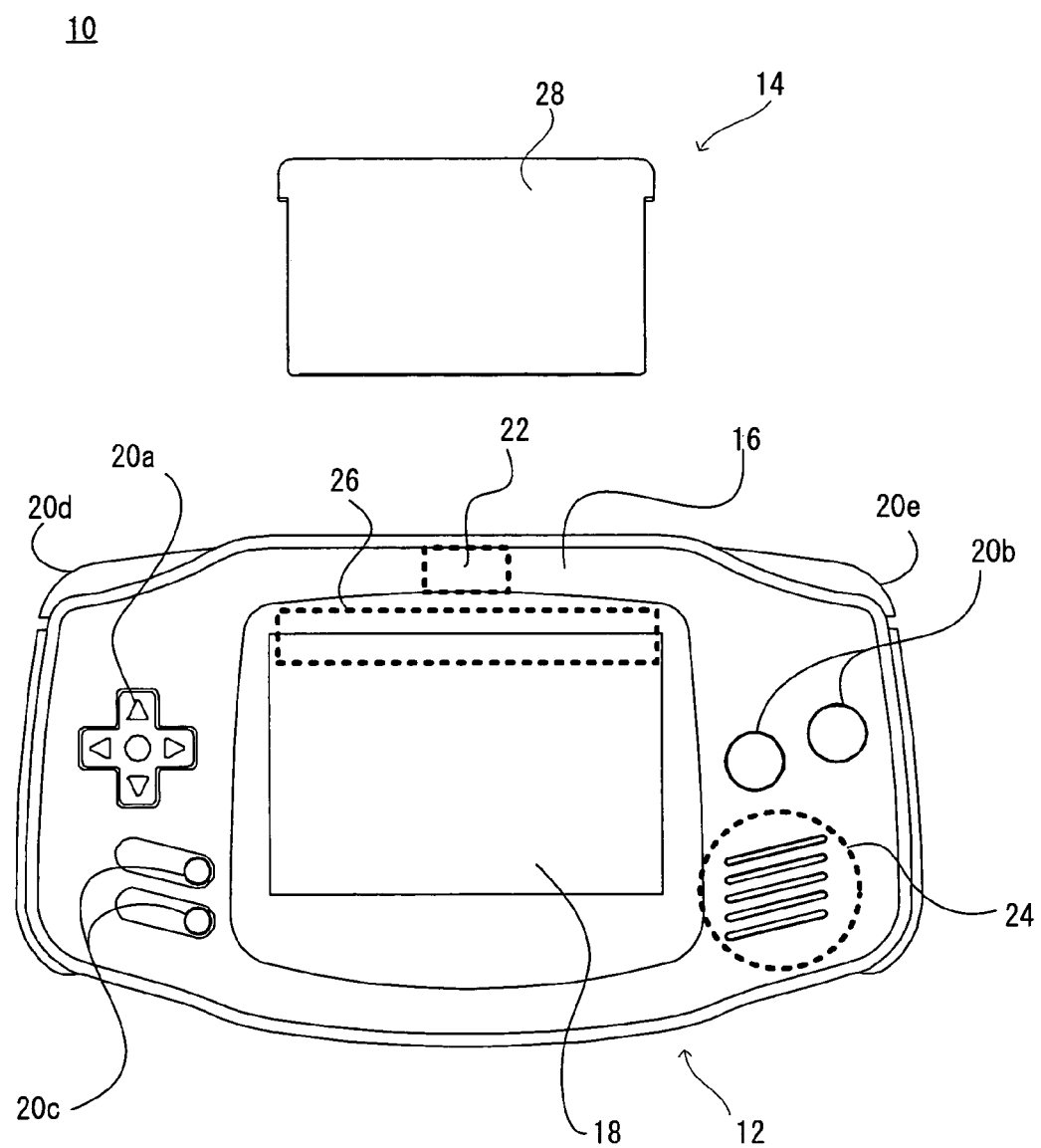
FIG. 1 is an appearance view showing one example of a game apparatus of one illustrative embodiment.

An exemplary game apparatus 10 of an illustrative embodiment shown in FIG. 1 includes a game machine 12 and a cartridge 14 to be connected to the game machine 12. The game machine 12 is a hand-held type game machine to be held with both hands, and allows a player to enjoy various games by exchanging the cartridge 14 detachable as an external storage medium storing a game program and data. In this embodiment, a puzzle game for solving a puzzle by strategically generating and arranging a duplicate of a player character (character to be operated by the player), for example, is played.

It is noted that the game machine 12 is not limited to the hand-held type game machine, and a video game console to be used by being connected to a television receiver for home use may be applicable. Furthermore, a game information storage medium is not limited to the cartridge 14, and various information storage mediums including an optical information storage medium such as a CD-ROM, a DVD-ROM, a magnetic optical disk, a magnetic disk, etc. may be applicable.

The game machine 12 includes a horizontally longer housing 16, for example, and on the one main surface of the housing 16 (front surface), a liquid crystal display (hereinafter, referred to as "LCD") 18 as one example of an image displaying means is provided at an approximate center thereof, and on both sides of the LCD 18, various operating switches 20 are provided as an operating means.

The operating switch 20 includes, for example, a direction switch 20a, an action switch 20b, a start/select button 20c, an L button 20d provided at a left corner of the housing 16, and an R button 20e provided at a right corner of the housing 16. The direction switch 20a is utilized for instructing a moving direction of the player character when the player character is operated during the game, and for moving a cursor in order to select an item, for example. The action switch 20b is utilized, for example, for instructing an action of the player character (jumping, swinging a sword, and so forth), determining/canceling a selection item, creating a duplicate, and so forth. The L button 20d and the R button 20e are utilized for instructing operations that are assigned to the action switch 20b, and another operation. The start/select button 20c is utilized for starting game play, suspending game operation, and so forth.

Figure 2:
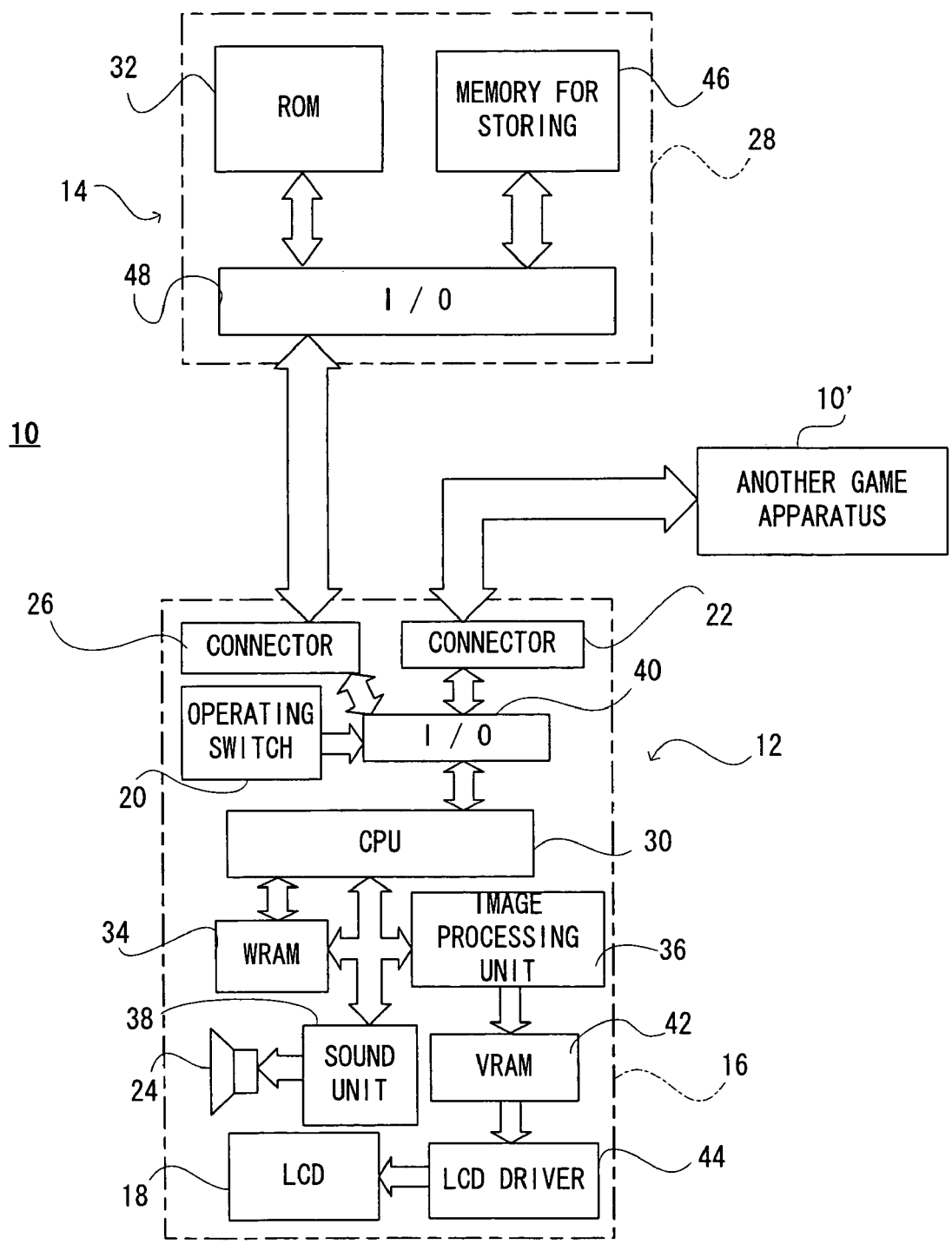
FIG. 2 is a block diagram showing one example of an internal configuration of FIG. 1 embodiment.

Furthermore, the game machine 12 is provided with a connector 22 on a top surface as necessary. The connector 22 is utilized for playing a communication game by being connected to another game apparatus 10' (or another game machine 12') as shown in FIG. 2, and exchanging data storing a content of the game processed in the game machine 12 with the other game apparatus 10'. In addition, a speaker 24 is integrated inside sound-bleeding holes provided on the surface of the housing 16, and a sound such as a BGM, a sound effect, etc. during the game is output therefrom.

The cartridge 14 includes a housing 28 detachable from the game machine 12 via a connector 26 provided on a rear surface of the housing 16. The cartridge 14 is connected to the game machine 12 via the connector 26, so that the game machine 12 functions as the puzzle game apparatus 10.

FIG. 2 shows a block diagram of the game apparatus 10. Referring to FIG. 2, the game machine 12 includes a CPU 30. The CPU 30 is called a processor or a computer, and performs a game process according to the program of a ROM 32 integrated in the cartridge 14. The CPU 30 is connected with a working RAM (hereinafter abbreviated as "WRAM") 34, an image processing unit 36, a sound unit 38, an input-output interface (hereinafter abbreviated as "I/O") 40, etc.

The WRAM 34 is utilized as a work area or a buffer area for the CPU 30. In the WRAM 34, data required for the game process is loaded, or data generated during the game is stored anew. The image processing unit 36 is connected with a video RAM (hereinafter abbreviated as "VRAM") 42. The image processing unit 36 generates, according to an instruction from the CPU 30, image data for display on the basis of the data temporarily stored in the WRAM 34. The VRAM 42 temporarily stores the image data for display generated by the image processing unit 36. The image data stored in the VRAM 42 is displayed on the LCD 18 via an LCD driver 44. The sound unit 38 converts sound data generated by the game processing, etc. of the CPU 30 into an analog signal to output it as music or an effective sound from the speaker 24.

The I/O 40 connects the CPU 30 with the operating switch 20, the connector 26 (cartridge 14), and the connector 22 (another game apparatus 10'). The CPU 30 detects operation input data from the operating switch 20 via the I/O 40 so as to use it for the program processing. Furthermore, the CPU 30 controls the cartridge 14 via the I/O 40. In addition, the CPU 30 performs a data exchange with the other game apparatus 10' via the connector 22 connected to the I/O 40.

The cartridge 14 is provided with the ROM 32, a memory for storing 46, etc. inside the housing 28, that are connected to a cartridge input/output interface (hereinafter abbreviated as "cartridge I/O") 48. The ROM 32 fixedly stores a program and data for causing the game apparatus 10 to function as a puzzle game apparatus. The memory for storing 46 is a writable/readable memory for storing game data, etc., and a flash memory being a non-volatile memory, an SRAM utilizing a battery as a power source, etc. are applicable. When the cartridge 14 is loaded into the game machine 12, the cartridge I/O 48 is connected to the CPU 30 via the connector 26 and the I/O 40. Thus, the CPU 30 accesses the ROM 32 and the memory for storing 46 via the cartridge I/O 48 to perform control of the cartridge 14 or a data exchange with the cartridge 14.

It is noted that although the game machine 12 and the cartridge 14 are connected with each other to make a single unit in this embodiment, these may be integrally formed with each other, that is, the ROM 32 and the memory for storing 46 may be integrated in the game machine 12.

Figure 3:
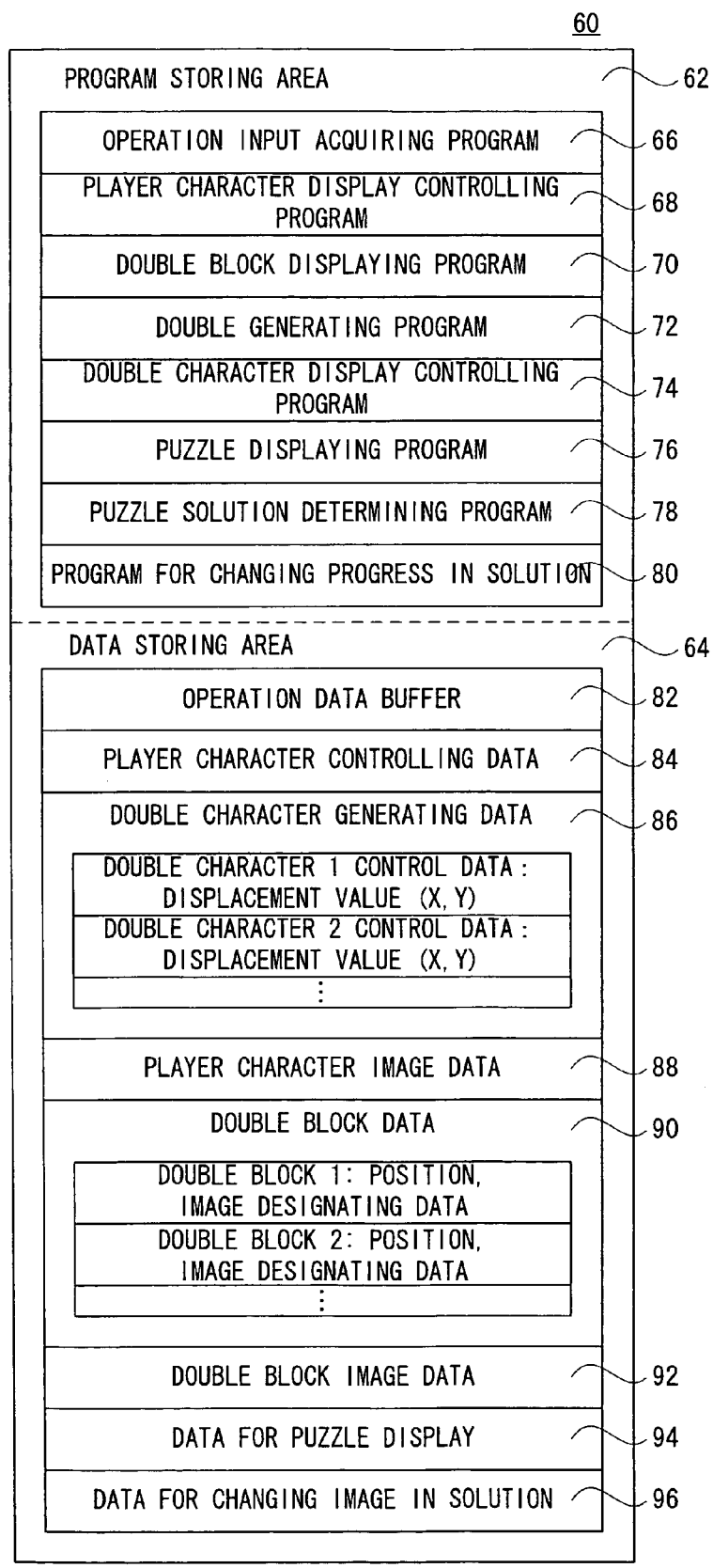
FIG. 3 is an illustrative view showing one example of a memory map.

FIG. 3 shows one example of a memory map 60 of the WRAM 34 of the game apparatus 10. The memory map 60 is roughly divided into a program storing area 62 and a data storing area 64. In the program storing area 62, various programs to be executed by the CPU 30 for causing the game machine 12 to function as a puzzle game apparatus according to the illustrative embodiments are stored. In the data storing area 64, various data to be utilized by the programs stored in the program storing area 62 are stored. Also, the data storing area 64 is an area for temporarily storing the data generated or acquired as a result of the program processing.

It is noted that although the memory map 60 is a memory map of the WRAM 34, in a case that the ROM 32 fixedly storing the program like the game apparatus 10 of this embodiment is directly connected to the CPU 30, there is no need to transfer a program and data so as to be stored in the WRAM 34. Because a part of each of the program storing area 62 and the data storing area 64 can fixedly be stored in the ROM 32, the CPU 30 can directly gain access to the ROM 32. It is noted that in a case of adopting such a form, it is impossible to write to the ROM 32, and therefore, only the data dedicated for reading is fixedly stored.

The program storing area 62 includes an operation input acquiring program storing area 66, a player character display controlling program storing area 68, a duplicating block displaying program storing area 70, a duplicate generating program storing area 72, a duplicate character display controlling program storing area 74, a puzzle displaying program storing area 76, a puzzle solution determining program storing area 78, and a storing area of a program for changing progress in solution 80, etc.

In the operation input acquiring program storing area 66, a program for acquiring data (operation input data) according to an operation of the operating switch 20 by the player is stored. The acquired operation input data is temporarily stored in an operation data buffer area 82.

In the player character display controlling program storing area 68, a program for controlling a display of the player character is stored. Data including position data, etc. of the player character and for controlling its operation is calculated on the basis of the operation input data, and temporarily stored in a player character controlling data area 84. An image of the player character 100 (FIG. 4) is generated on the basis of player character control data and player character image data so as to be displayed on the LCD 18.

In the duplicating block displaying program storing area 70, a program for displaying a duplicate block on the LCD 18 is stored. A duplicating block 102 (FIG. 4, etc.) is for creating a duplicate, e.g. a copy, of a player character 100. A plurality of kinds of the duplicating blocks 102 are prepared, and each duplicating block 102 is provided in a predetermined position near an image showing a puzzle, for example, in a virtual game space or a game field. The duplicating block 102 includes a plurality of block pieces, and the plurality of block pieces are arranged and combined in a predetermined form to make one duplicating block 102. As to the duplicating block 102 in FIG. 4, for example, a plurality of block pieces are arranged in a 4 by 5 matrix manner. The plurality of block pieces forming of the duplicating block 102 indicates a position (creating position) in the duplicating block 102 where a duplicate is creatable. The image of the duplicating block 102 is generated on the basis of duplicating block data and duplicating block image data so as to be displayed on the LCD 18.

Figure 17:
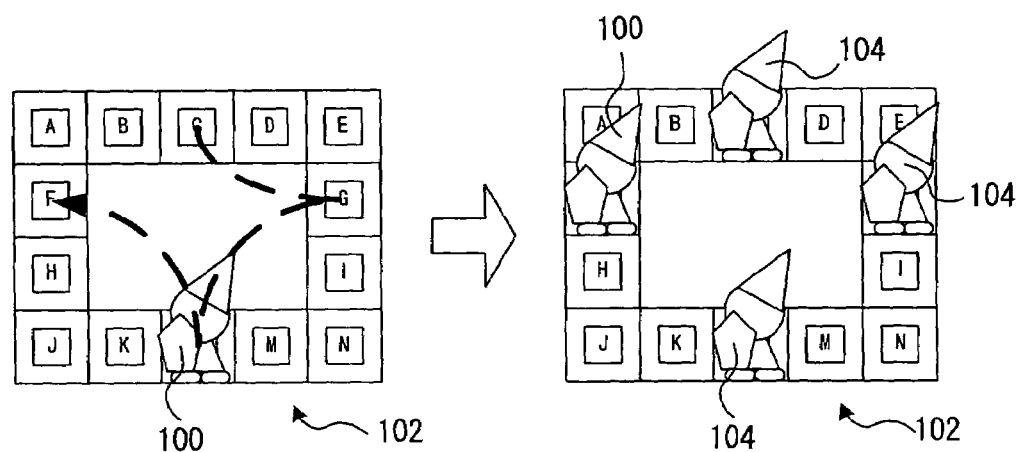
FIG. 17 is an illustrative view showing an outline of creating a duplicate character for solving the puzzle in FIG. 16.

In the duplicate generating program storing area 72, a program for creating a duplicate character is stored. A duplicate character 104 (in FIG. 5, etc.) is generated on the basis of at least the fact that the player character 100 exists in a predetermined position of the game field, and generated on the basis of the fact that the player character is superposed on the duplicating block 102 in this embodiment. For example, the player performs a predetermined operation input, for example, with the player character 100 superposed on any one of the block pieces of the duplicating block 102 to create the duplicate character 104 (FIG. 5) of the player character 100 on the block piece. Alternatively, the player can create a defined number of the duplicate characters 104 only by superposing the player character 100 on the defined number of the block pieces of the duplicating block 102 (FIG. 17). Furthermore, the duplicate character 104 moves while keeping a relative positional relationship with the player character 100 at a time of being generated. Here, in this illustrative embodiment, when the duplicate character 104 is generated, a relative displacement value from the position of the player character 100 as to the position of each of the duplicate characters 104 is calculated. Then, position data (control data) of each duplicate character 104 representative of the displacement value from the player character 100 is stored in a duplicate character generating data area 86. It is noted that a duplicate creating function of the duplicating block 102 may be validated when a predetermined condition is satisfied such as possessing a predetermined item by the player character 100, and so forth.

In the duplicate character display controlling program storing area 74, a program for controlling a display of the duplicate character 104 is stored. The duplicate character 104 is arranged with a relative positional relationship with the player character 100 at a time of being generated maintained in association with the player character 100. That is, the duplicate character 104 moves with a relative positional relationship with the player character 100 maintained as the player character 100 moves. The display position of the duplicate character 104 is calculated on the basis of the player character control data (position data) and the duplicate character control data (position data) evaluated by the operation input data. The image of the duplicate character 104 is generated on the basis of the display position data of the duplicate character 104 and the player character image data. Furthermore, a time limit is set to the display of the duplicate character 104, and when a predetermined time period elapses after the duplicate character 104 is generated or displayed, the duplicate character 104 disappears and is no longer displayed.

In the puzzle displaying program storing area 76, a program for displaying an image representative of the puzzle is stored. The puzzle image is for indicating a predetermined condition to be solved by the player, and provided in a predetermined position of the game field as a device or an obstacle, for example. As an example of the puzzle, a switch 108 for opening a door 106 shown in FIG. 4, a large block 110 to be carried on a passage shown in FIG. 8, etc. are provided. For example, the switch 108 for opening the door 106 includes a plurality of switch buttons arranged in a predetermined form, and the door is opened only when these switch buttons are simultaneously depressed. Furthermore, the large block 110 is moved only when pushed by a plurality of characters in a formation. The puzzle image is generated on the basis of data for puzzle display to be displayed on the LCD 18.

In the puzzle solution determining program storing area 78, a program for determining whether or not the puzzle is solved is stored. That is, it is determined whether or not a predetermined condition indicated by the puzzle image is satisfied by the program. For example, in a case of the switch 108 for opening the door 106, it is determined whether or not all the plurality of switch buttons are simultaneously depressed by the player character 100 and the double character 104. That is, it is determined whether or not the number of the player character 100 and the duplicate character 104 and its formation or arrangement pattern are respectively the same in the number of the switch buttons and its arrangement manner, and it is determined whether or not the player character 100 and the duplicate character 104 forming of the formation or the arrangement pattern are superposed on all the switch buttons. Furthermore, in a case of the large block 110, it is determined whether or not the overall part of a predetermined side of the block 110 are simultaneously contacted by the formation or the arrangement pattern formed of the player character 100 and the duplicate character 104.

Figure 7:
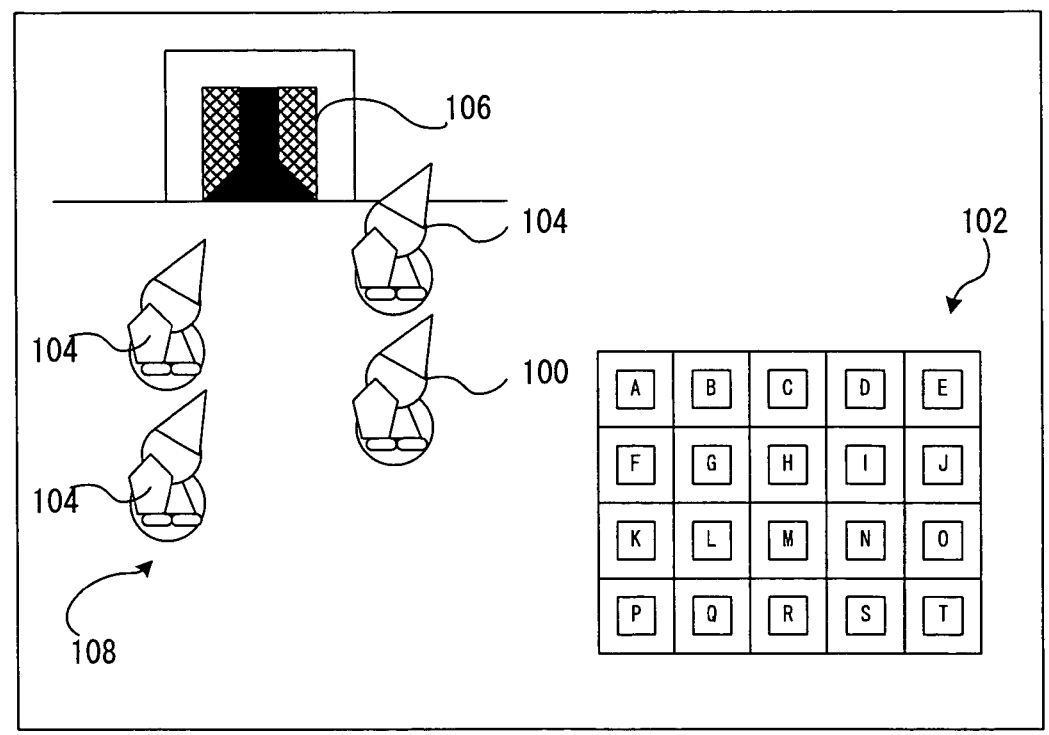
FIG. 7 is an illustrative view showing one example of a game screen when a puzzle in FIG. 4 is solved.
Figure 11:
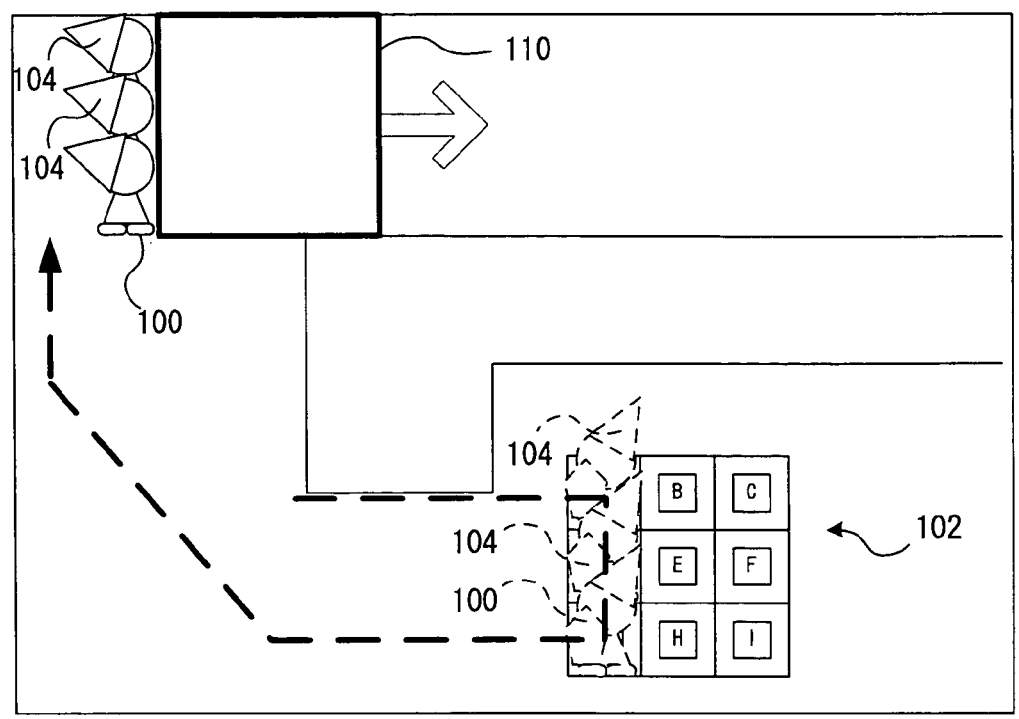
FIG. 11 is an illustrative view showing a manner of recreating a duplicate character following FIG. 10 to solve the puzzle.

A program for applying a change to the progress of the game when the puzzle is solved is stored in the storing area of a program for changing progress in solution 80. As one example, a change is applied to the game image when the puzzle is solved. For example, in a case of the switch 108 for opening the door 106, an image showing that the door 106 is opened is displayed (FIG. 7). Furthermore, in a case of the large block 110, an image showing that the block 110 is moved by the formation formed of the player character 100 and the duplicate character 104 is displayed (FIG. 11, etc.). The image in solution is generated on the basis of the data for changing an image in solution so as to be displayed on the LCD 18.

The data storing area 64 includes the operation data buffer area 82, the player character controlling data area 84, the duplicate character generating data area 86, a player character image data area 88, a duplicating block data area 90, a duplicating block image data area 92, a data area for puzzle display 94, a data area for changing image in solution 96, etc.

In the operation data buffer area 82, the operation input data from the operating switch 20 acquired or detected by the operation input acquiring program is temporarily stored.

In the player character controlling data area 84, data for controlling an action of the player character 100 is stored. The control data includes position data indicative of position coordinates of the player character 100 in a virtual game space or a game field.

In the duplicate character generating data area 86, data for controlling an action of each created duplicate character 104 is stored. The control data includes position data relating to a position of each duplicate character 104, and the position of each duplicate character 104 is represented by a relative displacement value (distance data from the player character 100) with the player character 100 in this embodiment, that is, a value in an X axis direction and a value in a Y axis direction taking the position of the player character 100 as a reference. It is noted that as the position data of each duplicate character 104, a relative position with the player character 100 is not stored, but the position coordinates in the game field may be stored as it is. It is noted that in this case, every time that the position of the player character 100 is updated, the position of each duplicate character 104 has to be updated.

In the player character image data area 88, image data for displaying the player character 100 is stored. In a case of displaying the double character 104 also, the image data of the player character 100 is utilized.

Data relating to each duplicating block 102 is stored, in the duplicating block data area 90. The duplicating block data includes position data indicative of a position of the duplicating block 102 in the game field, arrangement data indicative of a form or a position of the plurality of block pieces forming of the duplicating block 102, designating data (identifier) for designating an image to be utilized for each block piece for displaying the duplicating block 102, etc.

In the duplicating block image data area 92, image data for displaying each duplicating block 102 is stored. For example, image data to be utilized for each block piece forming the duplicating block 102 is stored in correspondence to the designating data (identifier).

In the data area for puzzle display area 94, data for displaying each puzzle is stored. The data for puzzle display includes position data indicative of a position of the puzzle in the game field, image data indicative of the puzzle, etc.

In the data area for image changing in solution 96, data for changing an image when the puzzle is solved is stored. The data for image changing in solution includes, for example, position data indicative of a position of the changing puzzle in the game field, image data indicative of a changing manner of the puzzle, etc.

In the game apparatus 10, a puzzle game for solving the puzzle by strategically creating the duplicate character 104 which makes a formation with the player character 100 is playable. The player creates the duplicate character 104 from the player character 100 so as to make the formation or the arrangement pattern that allows solution of the puzzle by use of the duplicating block 102 arranged near the puzzle.

Figure 4:
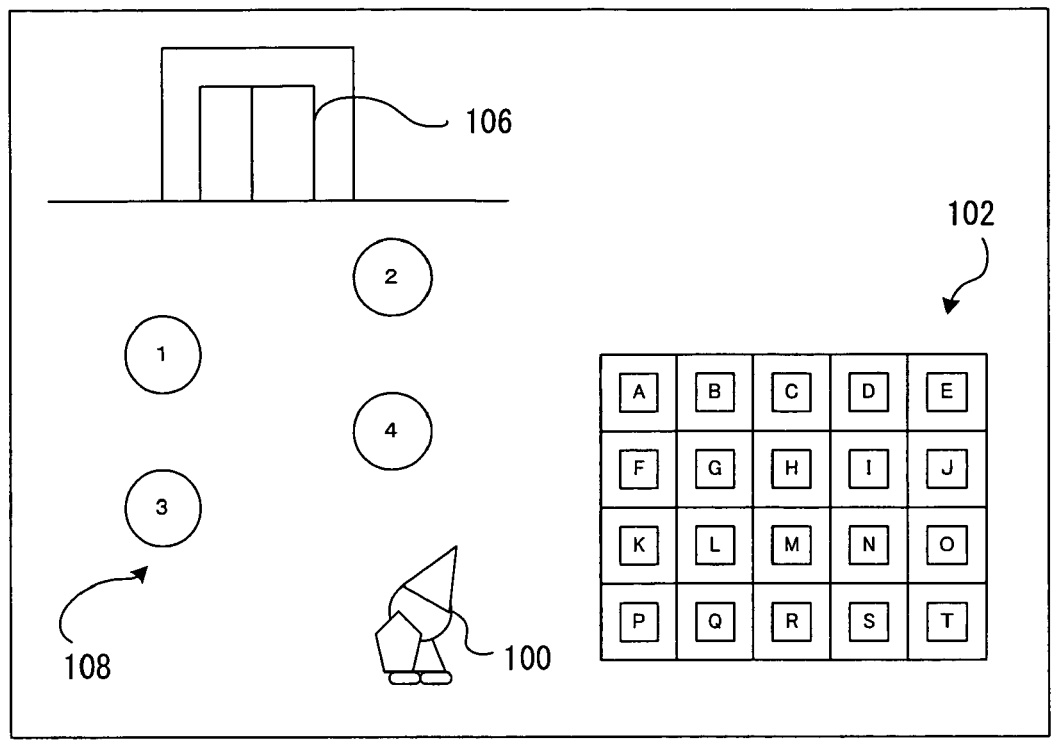
FIG. 4 is an illustrative view showing one example of a game screen including a puzzle.

FIG. 4 shows one example of the game screen on which the switch 108 for opening the door 106 is displayed as a puzzle. The switch 108 in FIG. 4 includes 4 button switches 1-4 arranged in a predetermined form, and the duplicating block 102 corresponding to the switch 108 is provided near the switch 108. The door 106 is opened when all the button switches are simultaneously depressed. The player creates the duplicate of the player character 100 by use of the duplicating block 102 of the block pieces A-T arranged in a matrix manner so as to be fitted into the switch 108.

Figure 5:
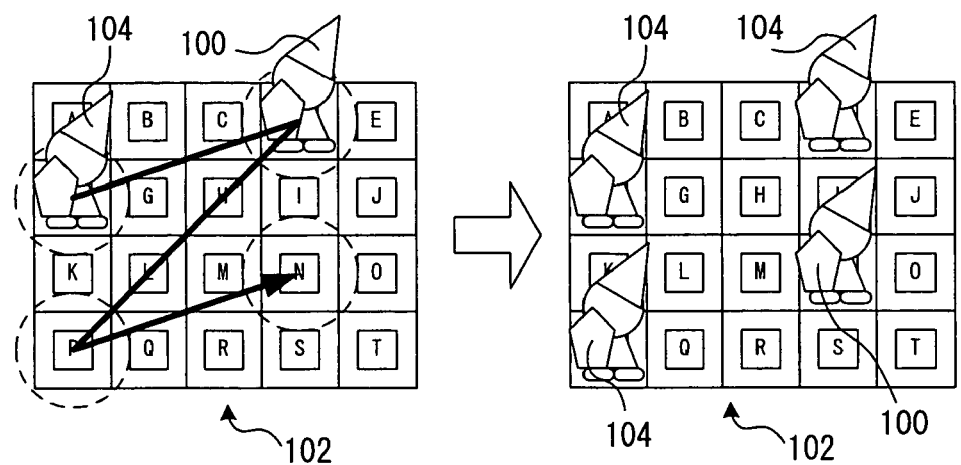
FIG. 5 is an illustrative view showing an outline of creating a duplicate character for solving the puzzle in FIG. 4.

In FIG. 5, an outline of creating the duplicate character 104 is shown. In order to be fitted into the switch 108 in FIG. 4, as one example, a formation may be made in which the duplicate characters 104 and the player character 100 are arranged in positions of block pieces F, D, P, N out of the duplicating block 102.

In this embodiment, the player first moves the player character 100 to a position of the block piece F by operating the direction switch 20a, and then operates a predetermined operating switch 20 (action switch 20b, for example). Thus, the duplicate character 104 as a copy of the player character 100 is created in the position of the block piece F. Next, the player moves the player character 100 to a position of the block piece D. At this time, as shown in the left of FIG. 5, the created duplicate character 104 stays in a position of the block piece F, and only the player character 100 moves. Then, by operating the predetermined operating switch 20 in a position of the block piece D, the player further creates the duplicate character 104 in that position. Next, the player similarly creates the duplicate character 104 in a position of the block piece P. Lastly, the player moves the player character 100 to a position of the block piece N, and operates the predetermined operating switch 20. In this manner, as shown in the right of FIG. 5, the player character 100 and the duplicate characters 104 in a desired formation can be created.

Figure 6:
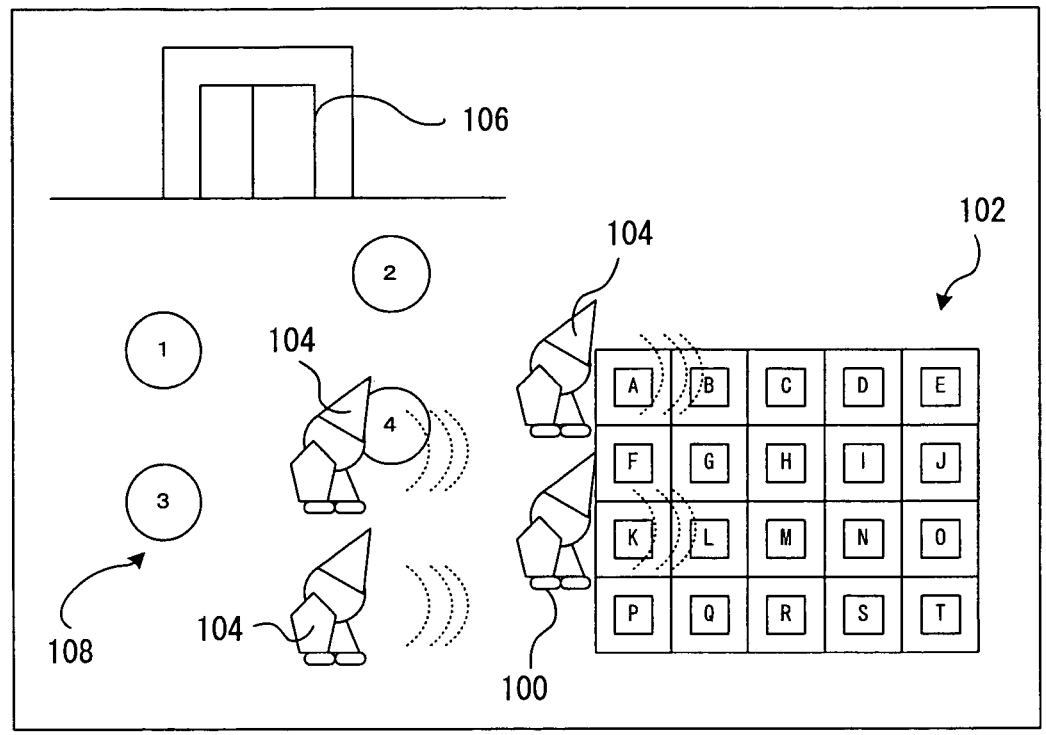
FIG. 6 is an illustrative view showing a moving manner of a formation including a player character and a double character.

After creating the duplicate characters 104, as shown in FIG. 6, the player moves the player character 100 and the duplicate characters 104 toward the switch 108 by operating the direction switch 20a. At this time, the player character 100 and the duplicate characters 104 move with the formation maintained. Furthermore, a time limit is set to the duplicate characters 104 as described later, and therefore, the player has to move the player character 100 and the duplicate characters 104 toward the position of the switch 108 within the time limit.

Then, as shown in FIG. 7, the player superposes the player character 100 and the duplicate characters 104 having a desired formation or an arrangement pattern on the switch 108. In this case, all the switch buttons of the switch 108 are simultaneously depressed, and thus, by determining that the puzzle is solved, an image showing the opened door 106 is generated and displayed.

Figure 8:
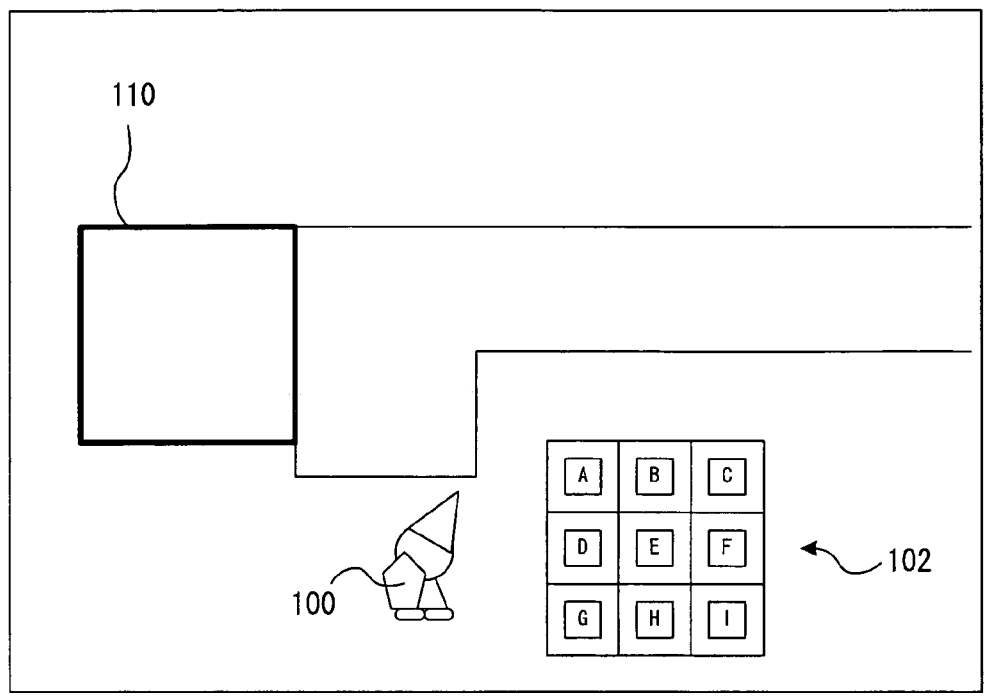
FIG. 8 is an illustrative view showing another example of a game screen including a puzzle.

Furthermore, FIG. 8 shows one example of the game screen in which the large block 110 is displayed as a puzzle. The block 110 cannot be moved by the player character 100 alone, and the duplicating block 102 corresponding to the block 110 is provided near it. When a predetermined side of the block 110 is touched by the player character 100 and enough duplicate characters 104 to correspond to its length, the block 110 becomes movable. The player creates the duplicate characters 104 by use of the duplicating block 102 including block pieces A-I arranged in a matrix manner in order to move the block 110.

Figure 9:
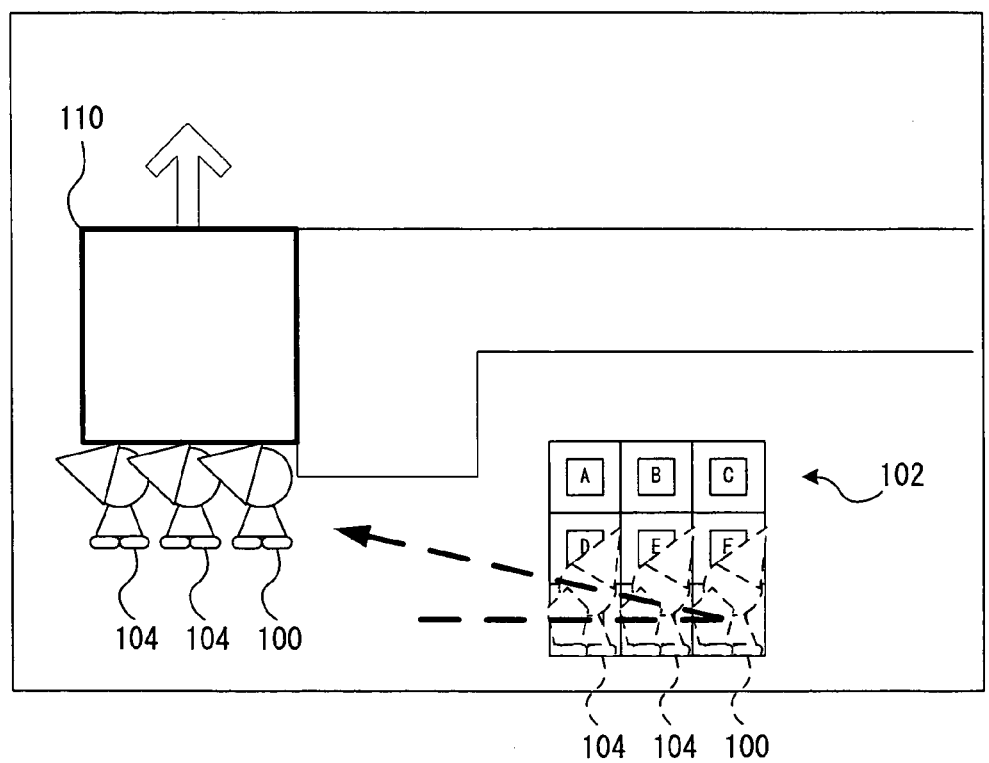
FIG. 9 is an illustrative view showing a manner of creating a duplicate character to solve the puzzle.

In order to be fitted against the block 110 in this state, it is necessary to create a formation in which three characters are horizontally arranged. That is, as shown in FIG. 9, as one example, a formation in which the double character 104 and the player character 100 are arranged in positions of the block pieces G, H, I out of the duplicating block 102 may be created. The player moves the player character 100 through the respective block pieces G, H, I as described above, and by operating the predetermined operating switch 20, the duplicate character 104 and the player character 100 forming a desired formation can be created, as shown by broken lines in FIG. 9.

Then, the player moves the formation so as to be brought into contact with the base of the block 110. Thus, it is determined that a solution to moving the block 110 from the FIG. 8 state is now had, and it becomes possible to move the block 110 towards the upper side of the screen. Since a time limit is set to the display of the duplicate character 104, the player has to complete the movement of the block 110 within the time limit.

Figure 10:
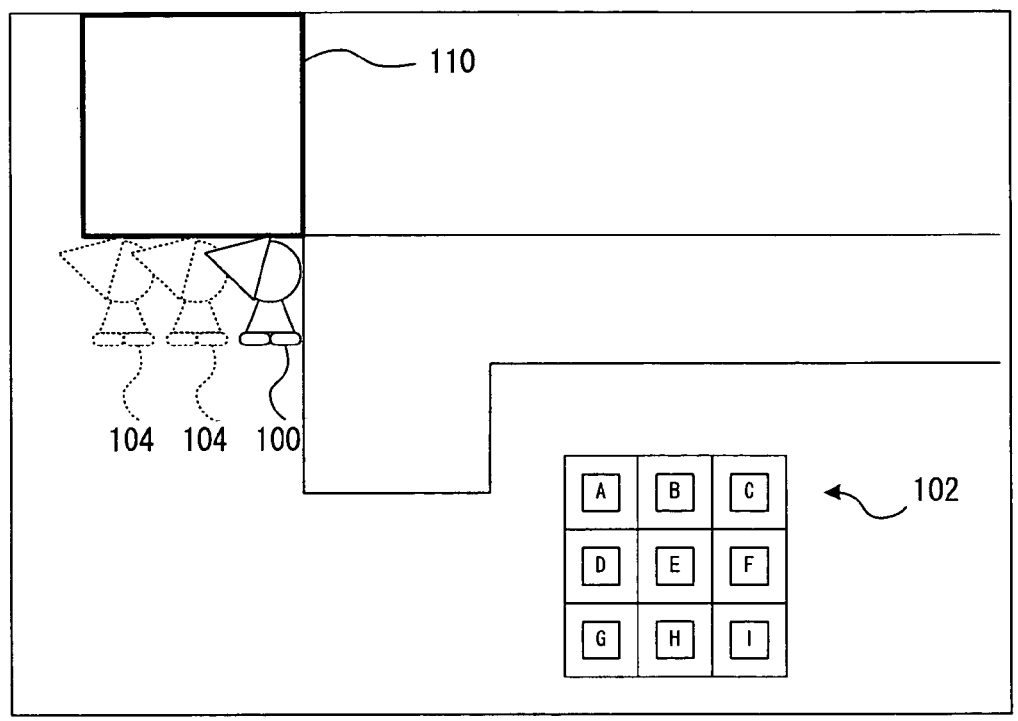
FIG. 10 is an illustrative view showing a manner when a time limit for displaying the duplicate character is exceeded succeeding to FIG. 9.

As shown in FIG. 10, when the time limit for displaying the duplicate character 104 is exceeded, only the player character 100 remains, and the duplicate character 104 disappears from the screen. It is noted that in FIG. 10, the disappearing duplicate character 104 is shown by dotted lines.

Furthermore, since the block 110 in a state of FIG. 10 cannot be moved by the player character 100 alone, the player creates a desired formation of the player character 100 and the duplicate characters 104 by use of the duplicating block 102. The block 110 in this state needs to be moved towards the right side of the screen by being touched on the left side, and therefore, it is necessary to change the formation.

In order to be fitted into the block 110 in the state of FIG. 10, a formation in which three characters are arranged in a vertical direction has to be created. That is, as shown in FIG. 11, a formation in which the duplicate character 104 and the player character 100 are arranged in positions of block pieces A, D, G, as one example, may be created. More specifically, the player moves the player character 100 through the respective block pieces A, D, G as described above, and creates a desired formation as shown by the broken lines in FIG. 11 by operating the predetermined operating switch 20.

Then, the player brings the formation into contact with the left side of the block 110. Thus, it is determined that the puzzle, of the block 110 in a state of FIG. 10, is solved, and it becomes possible to move the block 110 toward the right side of the screen as shown in FIG. 11.

Figure 12:
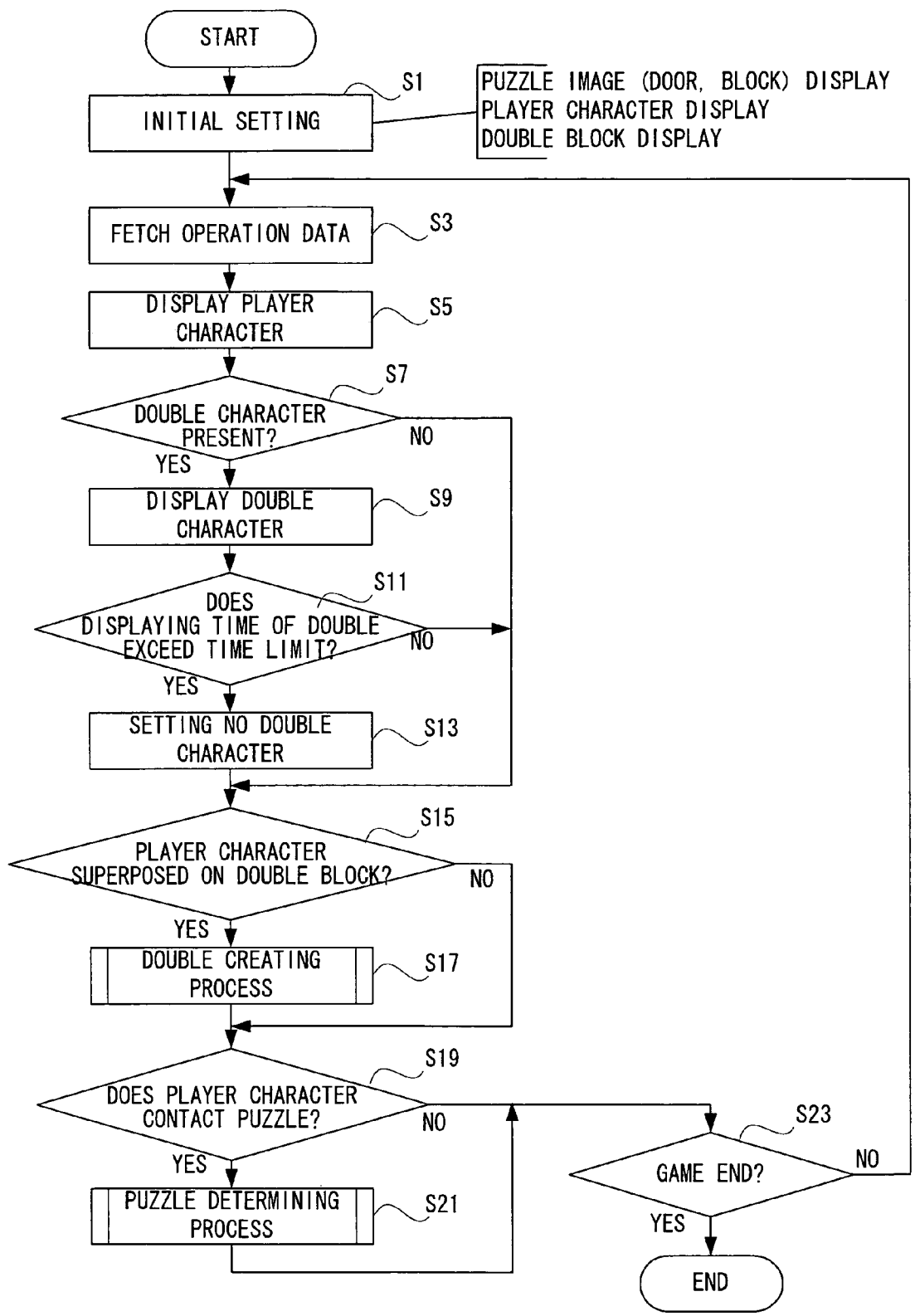
FIG. 12 is a flowchart showing one example of an operation of the game apparatus of FIG. 1.

FIG. 12 shows one example of a game operation of the game apparatus 10. In a first step S1 in FIG. 12, the CPU 30 executes an initial setting. For example, the puzzle image (door 106, switch 108, block 110, or the like), the player character 100, the duplicating block 102, and so on, are displayed in the game field. Thus, the game screen including the puzzle, as shown in FIG. 4 or FIG. 8 for example, is displayed on the LCD 18.

Next, in a step S3, the CPU 30 fetches operation input data from the operating switch 20 and temporarily stores it in the operation data buffer area 82. Then, in a step S5, the CPU 30 displays the player character 100 by utilizing the image processing unit 36, etc. on the LCD 18. For example, the control data, including at least a position of the player character 100, is updated on the basis of the fetched operation input data so as to be temporarily stored in the player character controlling data area 84. Then, an image of the player character 100 is generated on the basis of the player character control data and the player character image data according to the operation by the player.

Then, in a step S7, the CPU 30 determines whether or not the duplicate character 104 is present. For example, it is determined whether or not the control data of the duplicate character 104 is stored in the duplicate character generating data area 86, or it is determined whether or not a flag indicative of presence or absence of the duplicate character 104 is turned on. If "YES" in the step S7, the CPU 30 displays the duplicate characters 104 on the LCD 18 by use of the image processing unit 36, etc. in a step S9. For example, a display position of each duplicate character 104 is calculated on the basis of the control data (position data) of the player character 100 and the control data (relative position with the player character 100) of each duplicate character 104. Then, an image of each duplicate character 104 is generated in the calculated position of each duplicate character 104 by use of the player character image data. Thus, position of the duplicate characters 104, arranged when generated with a relative positional relationship with the player character 100, is maintained and is displayed in association with the player character 100. Therefore, a formation made by the player character 100 and the duplicate character 104 is displayed.

In a step S111, the CPU 30 determines whether or not the time the duplicate character 104 has been displayed exceeds a time limit. The displaying time of the double character 104 starts to be counted from a time when a first double character 104, for example, is displayed. If "YES" in the step S1, the CPU 30 clears the double character generating data area 86, for example, to set no double character in a step S13. On the other hand, if "NO" in the step S7, or if "NO" in the step S11, the process directly proceeds to a step S15.

In the step S15, the CPU 30 determines whether or not the player character 100 is superposed on the duplicating block 102 on the basis of the player character control data and the duplicating block data. If "YES" in the step S15, that is, if the player puts the player character 100 on the duplicating block 102, the CPU 30 executes a duplicate creating process in a succeeding step S17. The operation of the duplicate creating process is shown in detail in FIG. 13 as described later. In this process, the duplicate character 104 is created by use of the duplicating block 102 in response to the operation by the player, and a formation of the player character 100 and the double character 104 is created. On the other hand, if "NO" in the step S15, the process proceeds to a step S19.

Figure 14:
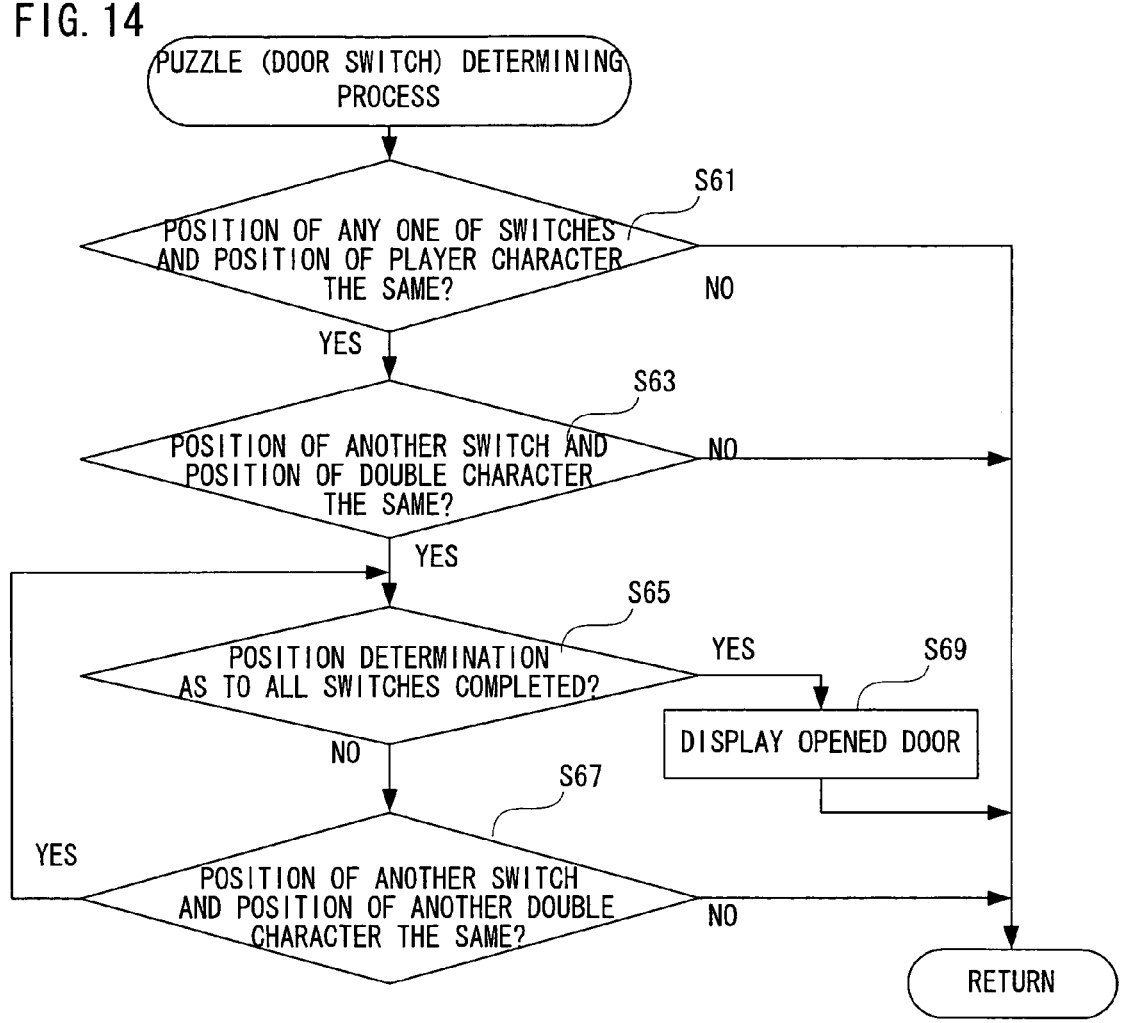
FIG. 14 is a flowchart showing one example of an operation of a puzzle condition determining process in FIG. 12 in a case that the puzzle is a switch of a door.

In a step S19, the CPU 30 determines whether or not the player character 100 is brought into contact with the puzzle on the basis of the player character control data and the data for puzzle display. That is, it is determined whether or not the player character 100 is brought into contact with the switch 108 for opening the door 106, the block 110, or the like. If "YES" in the step S19, the CPU 30 executes a puzzle determining process in a succeeding step S21. The operation of the puzzle determining process is shown in FIG. 14 (for the switch 108 of the door 106) and FIG. 15 (for the block 110) in detail as described later. In this process, it is determined whether or not the puzzle is solved, and in a case that the puzzle is solved, a change is applied to the progress of the game.

On the other hand, if "NO" in the step S19, or after completion of the step S21, the CPU 30 determines, in a succeeding step S23, whether or not the game is over. If "NO" in the step S23, the process returns to the step S3 to repeat the process. Then, if "YES" in the step S23, a process for ending the game is executed to end the game.

Figure 13:
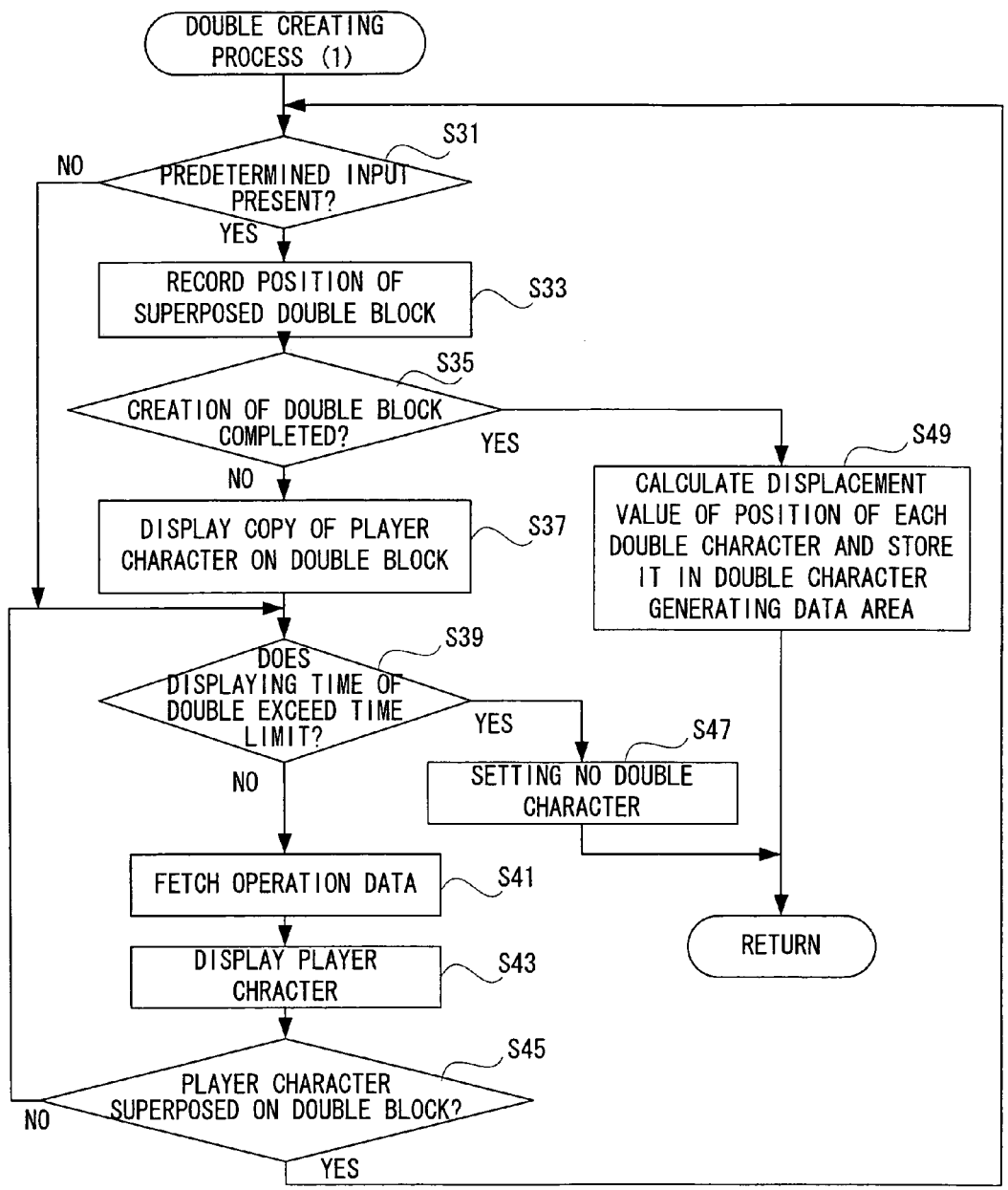
FIG. 13 is a flowchart showing one example of an operation of a duplicate creating process in FIG. 12 corresponding to the creating process in FIG. 5.

FIG. 13 shows one example of an operation of the duplicate creating process in the step S17 in FIG. 12. In a first step S31 in FIG. 13, the CPU 30 determines whether or not a predetermined operation input is present. That is, it is determined on the basis of the data in the operation data buffer area 82 whether or not an operation input from the predetermined operating switch 20 is present in a state the player character 100 is superposed on the duplicating block 102. If "YES" in the step S31, the CPU 30 records a position of the block piece of the duplicating block 102 on which the player character 100 is superposed in a step S33 in a predetermined area of the WRAM 34. On the other hand, if "NO" in the step S31, the process proceeds to a step S39.

Next, the CPU 30 determines whether or not creation of the duplicate is completed in a step S35. In this illustrative embodiment, since the number of the duplicate characters 104 to be created is decided depending on the puzzle, it is determined whether or not the number of the positions stored in the step S33 is equal to the number obtained by adding "1" (the number of player characters 100) to a defined value of allowable duplicate characters 104, for example. Or, in a case that completion of creating the duplicate is input according to the operation of the predetermined operating switch 20 by the player, it may be possible that it is determined whether or not an operation input indicative of the completion of creation is present.

If "NO" in the step S35, that is, in a case of creating the duplicate character 104, the CPU 30 displays, in a step S37, a copy of the player character 100 as the duplicate character 104 on the block piece of the duplicating block 102 stored in the step S33 by use of the image processing unit 36, etc. It is noted that although illustration is omitted, when displaying the first double character 104, for example, the CPU 30 starts to count the amount of time for which the double character 104 is displayed.

In the step S39, the CPU 30 determines whether or not the amount of time for which the double character 104 is displayed exceeds a time limit. If "NO" in the step S39, that is, in a case that creation of the duplicate characters 104 is continued and it is within the time limit, the CPU 30 fetches the operation input data in a step S41 similarly to the step S3 in FIG. 12 to temporarily store it in the operation data buffer area 82. Then, the CPU 30 displays the player character 100 on the LCD 18 in response to the operation input in a step S43 similarly to the step S5 in FIG. 12.

Next, in a step S45, the CPU 30 determines whether or not the player character 100 is superposed on the duplicating block 102 similar to the step S15 in FIG. 12. If "NO" in the step S45, the process returns to the step S39 to repeat the process. On the other hand, if "YES" in the step S45, the process returns to the step S31 to repeat the process.

Furthermore, if "YES" in the step S39, that is, if the displaying time of the duplicate character 104 exceeds the time limit in the course of creating the duplicate character 104, the CPU 30 clears the position data stored in the step S33 to set no duplicate character in a step S47. Then, an image of the duplicate character 104 displayed in the step S37 is erased from the VRAM 42 so as not to be displayed on the LCD 18. After completion of the step S47, the duplicate creating process is completed to return to the step S19 in FIG. 12.

If "YES" in the step S35, that is, if creation of the duplicate character 104 is completed, the CPU 30 calculates a displacement value of the position of each duplicate character 104 from the position of the player character 100 on the basis of each position data stored in the step S33, and stores it in the duplicate character generating data area 86 in a succeeding step S49. After completion of the step S49, the duplicate creating process is completed to return to the step S19 in FIG. 12.

FIG. 14 shows one example of an operation of the puzzle determining process in the step S21 in FIG. 12. The puzzle determining process in FIG. 14 is applied in a case the puzzle is the switch 108 for opening the door 106, for example. In a first step S61 in FIG. 14, the CPU 30 determines whether or not a position of any one of the switch buttons of the switch 108 and the position of the player character 100 are the same. If "NO" in the step S61, since the puzzle is not solved, the puzzle determining process is ended to return to the step S23 in FIG. 12.

On the other hand, if "YES" in the step S61, the CPU 30 determines whether or not a position of another switch button of the switch 108 and any one of the positions of the duplicate characters 104 are the same in a succeeding step S63. If "NO" in step S63, since the puzzle is not solved, the puzzle determining process is ended to return to the step S23 in FIG. 12.

If "YES" in the step S63, the CPU 30 determines whether or not position determination as to all the switch buttons of the switch 108 has been completed in a next step S65.

If "NO" in the step S65, the CPU 30 determines whether or not a position of a further switch button (whose position has not yet been determined) of the switch 108 and a position of any one of the other duplicate characters 104 are the same in a step S67. If "NO" in the step S67, since the puzzle is not solved, the puzzle determining process is ended to return to the step S23 in FIG. 12.

On the other hand, if "YES" in the step S67, the process returns to the step S65 to repeat the process. If "YES" in the step S65, that is, if the positions of all the rest of the switch buttons of the switch 108 and the positions of the rest of the duplicate characters 104 are the same, it is determined that the puzzle is solved. Accordingly, in a succeeding step S69, the CPU 30 generates an image showing that the door 106 is opened, by using the image processing unit 36, etc. to display it on the LCD 18. After completion of the step S69, the puzzle determining process is ended to return to the step S23 in FIG. 12.

Figure 15:
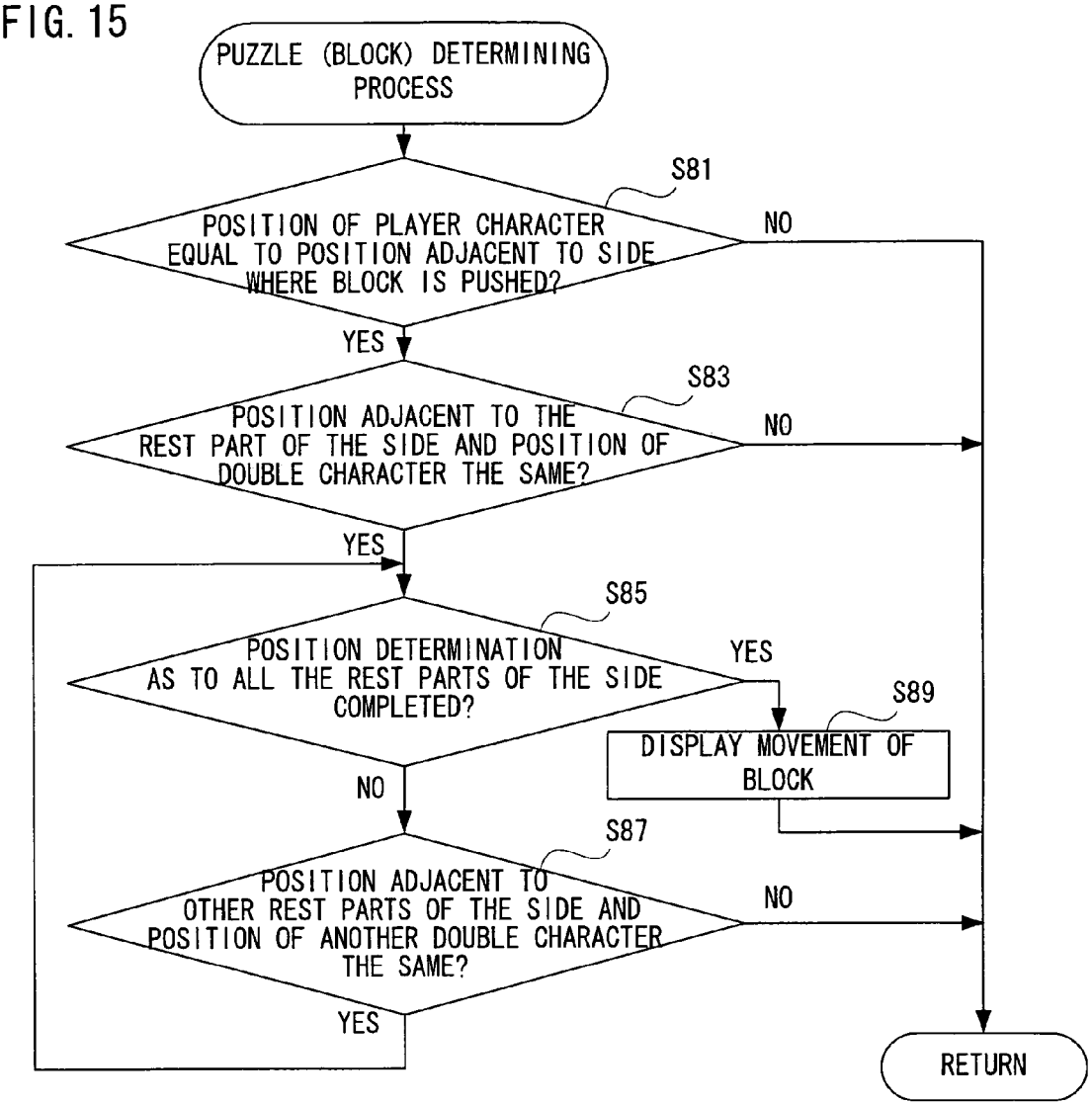
FIG. 15 is a flowchart showing one example of an operation of the puzzle condition determining process in FIG. 12 in a case that the puzzle is a block.

Furthermore, FIG. 15 shows another example of an operation of the puzzle determining process in the step S21 in FIG. 12. The puzzle determining process in FIG. 15 is applicable, for example, when the puzzle is the large block 110. In a first step S81 in FIG. 15, the CPU 30 determines whether or not the position of the player character 100 is equal to the position adjacent to the side where the block 110 can be pushed. In the FIG. 9 example, it is determined whether or not the position of the player character 100 is equal to the position adjacent to the bottom of the block 110. If "NO" in the step S81, since the puzzle is not solved, the puzzle determining process is ended to return to the step S23 in FIG. 12.

On the other hand, if "YES" in the step S81, the CPU 30 determines whether or not a position adjacent to the remaining portion of the side is equal to a position of any one of the duplicate characters 104 in a further step S83. If "NO" in the step S83, the puzzle determining process is ended to return to the step S23 in FIG. 12 since the puzzle is not solved.

If "YES" in the step S83, the CPU 30 determines whether or not determination of the position of further remaining duplicate blocks with regards to all the further remaining portions of the side is completed in a step S85.

If "NO" in the step S85, the CPU 30 determines whether or not a position adjacent to other remaining portions of the side (where the determination has not yet been completed) and a position of any one of the other duplicate characters 104 are the same in a step S87. If "NO" in the step S87, since the puzzle is not solved, the puzzle determining process is ended to return to the step S23 in FIG. 12.

On the other hand, if "YES" in the step S87, the process returns to the step S85 to repeat the process. Then, if "YES" in the step S85, that is, if all the positions adjacent to the remaining portions of the side of the block 110 and the positions of the rest of the duplicate characters 104 are the same, a determination that the puzzle is solved can be made. Accordingly, in a succeeding step S89, the CPU 30 generates, by use of the image processing unit 36, etc., an image showing that the block 110 is moved by the player character 100 and the duplicate character 104 in formation, and displays it on the LCD 18. After the completion of the step S89, the puzzle determining process is ended to return to the step S23 in FIG. 12.

According to this illustrative embodiment, when the formation or the arrangement pattern of the double character 104 and the player character 100 satisfies a predetermined condition represented by the puzzle image, the progress of the game is changed. Accordingly, it is possible to provide a novel puzzle game in which it is required to tactically create the duplicate character 104 and arrange it in association with the player character 100.

Furthermore, a time limit may be provided for displaying the duplicate character 104, so tactics and quick play are required for solving the puzzle. Therefore, it is possible to provide more tension in the puzzle solving process, making the game more difficult and enjoyable.

In addition, when the duplicate character 104 is created, it is necessary to skillfully superpose the player character on a desired creating position of the duplicating block 102 by taking into account the formation or the arrangement pattern to be fitted into the predetermined condition represented by the puzzle image. Accordingly, it is possible to provide a puzzle game adding a new operation to the work of creating the duplicate of the player character 100.

It is noted that in the above-described illustrative embodiment, when a predetermined operation input is present in a state that the player character 100 is superposed on the block piece of the duplicating block 102, the duplicate character 104 is generated so as to be displayed on the position of the block piece. However, in another illustrative embodiment shown in FIG. 16, it may be possible that merely by superposing the player character 100 on the block piece of the duplicating block 102, the double character 104 is generated in the position of the block piece without the predetermined operation input. In this case, it may be possible that when the player character 100 is only superposed on the block piece of the duplicating block 102 a defined number of time, all of the duplicate characters 104 are displayed.

Figure 16:
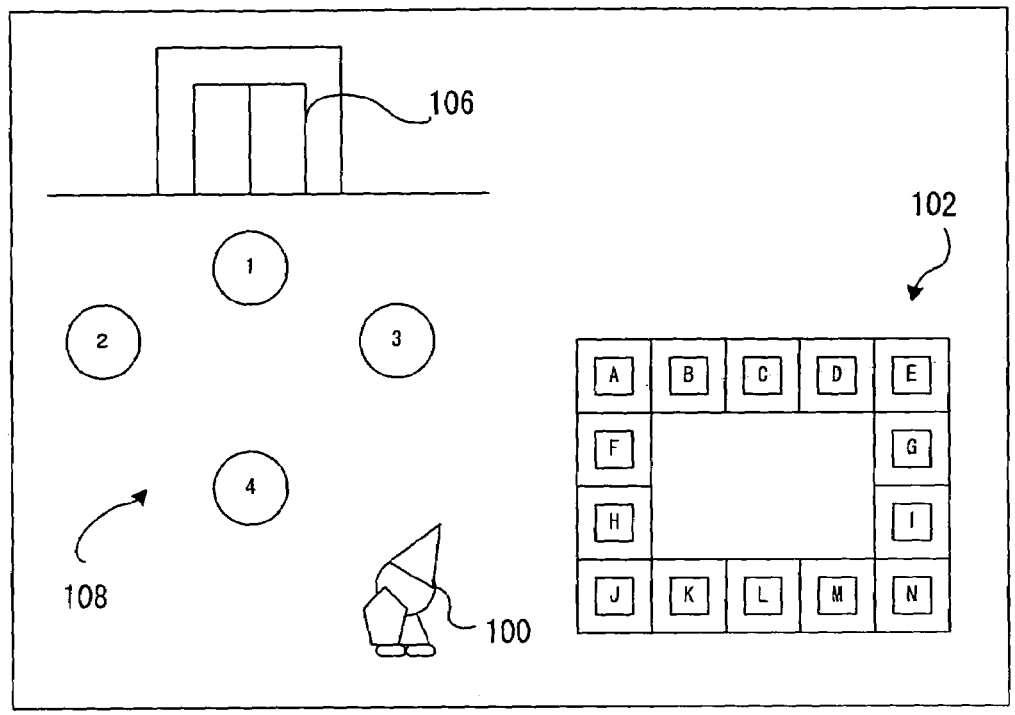
FIG. 16 is an illustrative view showing another example of a game screen including a puzzle.

On the game screen in FIG. 16, the switch 108 for opening the door 106 is provided as a puzzle, and the duplicating block 102 corresponding to the switch 108 is provided near the switch 108. The switch 108 includes four switch buttons 1-4 arranged in a predetermined form, and therefore, it turns out that three duplicate characters 104 need to be created. Accordingly, in this embodiment, it is necessary to superpose the player character 100 on the duplicating block 102 just four times. As to the duplicating block 102, the block pieces A-N are arranged in the shape of rectangle and frame. It is appropriate that in order to be fitted into the switch 108, a formation in which the duplicate character 104 and the player character 100 are arranged in positions of four block pieces C, G, L, F out of the duplicating block 102 is created.

When creating the formation, the player, as shown in the left of FIG. 17, puts the player character 100 on the block pieces in an order of C, G, L, F, for example, by operating the direction switch 20*a*. It is noted that the player has to move the player character 100 such that the player character 100 does not move on another block piece of the duplicating block 102. When the player character 100 is put on the block piece F according to such the operation, the duplicate characters 104 are displayed in the positions of the block pieces C, G, L as shown in the right of FIG. 17. Thus a desired formation of the player character 100 and the duplicate characters 104 can be obtained.

Accordingly, in this illustrative embodiment, by merely superposing the player character 100 on the duplicating block 102, the double character 104 is generated without a predetermined operation input, and therefore, the player can easily create the double character 104 by simply one or more moving operations using the direction switch 20*a*. It is noted that since the player character 100 cannot be put on a position of the duplicating block 102 except for where the double character 104 is desired to be created, lest an extra duplicate be made, careful operation is required. Since the duplicate character 104 is displayed when the player character 100 is superposed on the block piece of the duplicating block 102 only a defined number of times, the player has to consider and remember a position where the duplicate character 104 is to be created in advance. Accordingly, the difficulty level for creating the duplicate character 102 can be heightened.

Figure 18:
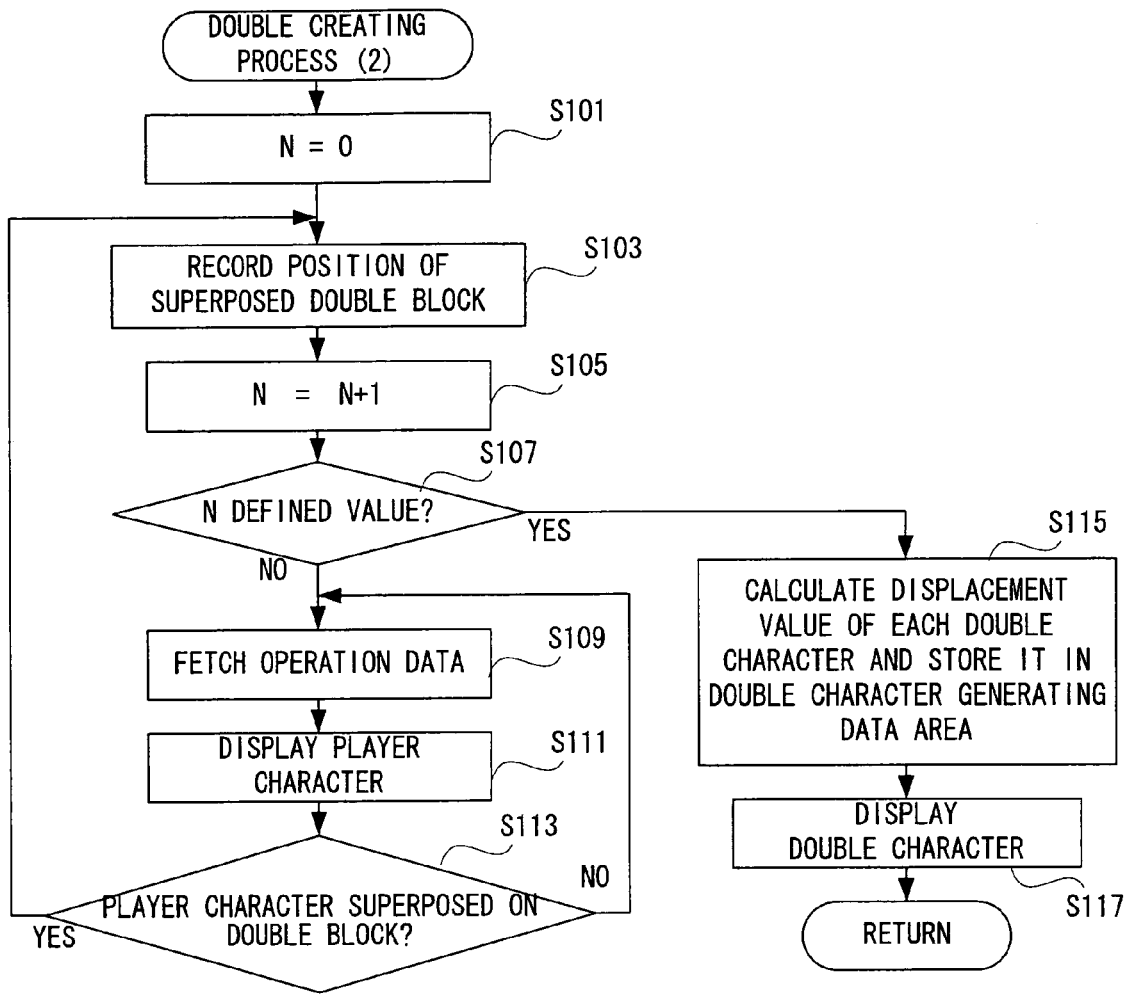
FIG. 18 is a flowchart showing one example of the operation of the duplicate creating process in FIG. 12 in correspondence to the creating process in FIG. 17.

FIG. 18 shows one example of an operation of the duplicate creating process in the step S17 in FIG. 12 in one other illustrative embodiment. In a first step S101 in FIG. 18, the CPU 30 sets a default value of "0" to a variable N for counting the number of times of superposition on the block piece of the duplicating block 102.

Next, in a step S103, the CPU 30 stores a position of the block piece of the duplicating block 102 where the player character 100 is superposed in a predetermined area of the WRAM 34.

Then, the CPU 30 adds "1" to the variable N in a step S105, and it is determined whether or not the value of the variable N is equal to a defined value in a step S107. In a FIG. 16 example, it is determined whether or not N is "4".

If "NO" in the step S107, the CPU 30 fetches operation input data in a step S109 similar to the step S3 in FIG. 12. Then, the CPU 30 displays the player character 100 on the LCD 18 according to the operation input in a step S111 similar to the step S5 in FIG. 12.

Next, the CPU 30 determines whether or not the player character 100 is superposed on the duplicating block 102 in a step S113 similar to the step S15 in FIG. 12. If "NO" in the step S105, the process returns to the step S109 to repeat the process. Alternatively, if "YES" in the step S105, the process returns to the step S103 to repeat the process.

On the other hand, if "YES" in the step S107, that is, if the player character 100 has been superposed on the block pieces of the duplicating block 102 a defined number of times, the CPU 30 calculates a displacement value between each of the duplicate characters 104 and the player character 100 on the basis of each of the position data stored in the step S103, and stores it in the duplicate character generating data area 86 in a step S115. Then, the CPU 30 displays the duplicate character 104 on the LCD 18 in a step S117 similar to the step S9 in FIG. 12. After completion of the step S117, the double creating process is ended, and the process returns to the step S19 in FIG. 12.

In addition, in each of the above-described illustrative embodiments, the duplicating block 102 is formed in a form including a shape or an arrangement manner corresponding to a form of the switch 108 for opening the door 106 and the block 110 as a puzzle. However, in another illustrative embodiment shown in FIG. 19, the form of the duplicating block 102 does not have to include the form of the puzzle.

Figure 19:
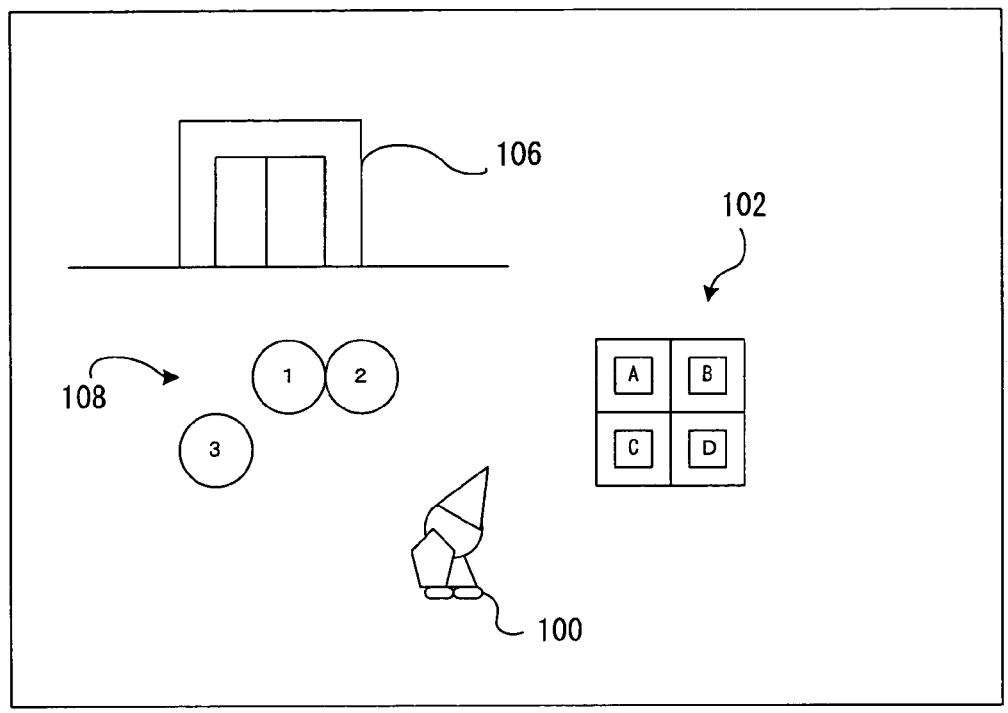
FIG. 19 is an illustrative view showing a still another example of a game screen including a puzzle.

That is, on the game screen in FIG. 19, the switch 108 for opening the door 106 is provided as a puzzle. The switch 108 includes three switch buttons 1-3 arranged in a predetermined form. Although the duplicating block 102 is provided near the switch 108, the duplicating block 102 has a form that does not include the shape or the arrangement manner of the switch 108, and in which block pieces A-D are arranged in a matrix manner of 2×2. Accordingly, in this illustrative embodiment, creating the formation takes more effort. Here, in this illustrative embodiment, after the duplicate character 104 is generated, when a predetermined operation input is present, for example, the duplicate character 104 is displayed, and then, the duplicate character 104 is moved according to the movement of the player character 100.

Therefore, every time that the player generates the duplicate character 104, he has to make an entire formation while moving the duplicate character 104 together with the player character 100. Specifically, the player is required to create the duplicate character 104 taking into account a creating position and movement of each of the duplicate characters 104. Accordingly, it is possible to raise a difficulty level for creating the duplicate character 104. Furthermore, in a case that a time limit is provided for the display of the duplicate character 104, the player has to create the formation more quickly. Accordingly, this causes tension, and requires more strict tactics.

Figure 20:
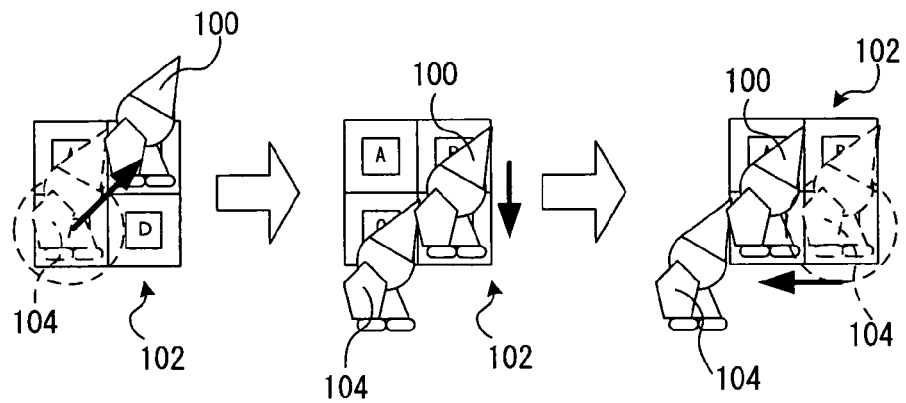
FIG. 20 is an illustrative view showing an outline of creating the duplicate character for solving the puzzle in FIG. 19.

When forming a formation fitted into the switch 108, as shown in the left of FIG. 20, the player operates the predetermined operating switch 20 in a state the player character 100 first puts on the block piece C by operating the direction switch 20*a*. Thus, the duplicate character 104 is generated in a position of the block piece C. Next, the player moves the player character 100 to the block piece B and then, operates a predetermined operating switch 20, for example. Thus, the duplicate character 104 is displayed in a position of the block piece C. At this time, a relative displacement value between the duplicate character 104 and the player character 100 is calculated so as to be stored in the duplicate character generating data area 84 as control data of the duplicate character 104. Accordingly, the duplicate character 104 moves together with the player character 100 while maintaining a relative positional relationship with the player character 100 at this time.

Then, as shown in the center of FIG. 20, the player moves the player character 100 to the block piece D, and then operates the predetermined operating switch 20. Thus, a further duplicate character 104 is generated in the position of the block piece D. Then, as shown in the right of FIG. 20, the player moves the player character 100 to a position of the block piece C, and then, operates a predetermined operating switch 20. Thus, the further duplicate character 104 is displayed in a position of the block piece D, and the formation of the player character 100 and the duplicate character 104 is fixed. Furthermore, similar to the above-described duplicate character 104, a displacement value indicative of the position of the further duplicate character 104 is calculated and stored in the duplicate character generating data area 84. In this manner, the player character 100 and the duplicate character 104 making a formation that fits onto the switch 108 can be created.

The above-described FIG. 20 example describes a case where a duplicate creating process for generating the duplicate character 104 when a predetermined operation input (operation of the action switch 20*b*, etc.) by the player is present. However, also in FIG. 19, the duplicate creating process for generating the duplicate character 104 on the basis of a fact that the player character 100 is superposed on the duplicate block 102 without a predetermined input similar to the above-described FIG. 16 embodiment may be applicable. In this case, when oblique movement on the duplicating block 102 is performed as shown in the left of FIG. 20, for example, the player character 100 may step on the unintended block piece D. Accordingly, in one illustrative embodiment, only when the player character 100 is superposed on the area equal to or more than a predetermined ratio (50%, for example) of the block piece of the duplicating block 102, is the generating of the duplicate character 104 in that position of the block piece performed.

In addition, in each of the above-described illustrative embodiments, when the puzzle is solved, changed images are displayed in correspondence with the solution of the puzzle, whereby changes or influence is provided on the progress of the game. More specifically, in a case of the door 106, an image showing that the door is opened is displayed, and in a case of the block 110, an image showing that the block 110 is moved is displayed, whereby the player can be informed that the obstacle for progressing the game is cleared. That is, in each of the above-described illustrative embodiments, when the puzzle is solved, a changing manner of a visible thing on the screen (obstacle, for example) is displayed. However, the change applied when the puzzle is solved in the progress of the game is not limited to the above description. In another illustrative embodiment, for example, an image may be changed such that an invisible thing on the screen becomes visible. As several examples, various changes such as constructing a bridge where a passage is absent, the appearance of a dungeon, the falling of an item, and so forth are conceivable. Furthermore, an invisible change on the screen rather than a visible change on the screen may be applied. As an example, a change of an attribute value such as power-up or level-up of the player character 100 is conceivable.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A puzzle game apparatus, comprising:
at least one operating control for use by a player in performing a game operation;
a display that displays game images;
player character display programmed logic circuitry that displays a player character to be operated by the player on said display in response to an input from said at least one operating control;
puzzle display programmed logic circuitry that displays on said display a puzzle image indicative of a puzzle to be solved;
duplicating block display programmed logic circuitry that displays a player character duplicating block having a plurality of duplicate character creating locations arranged in a predetermined form on said display;
duplicate character generating programmed logic circuitry that generates a duplicate character as a copy of a player character existing in a predetermined position within a game field, said duplicate character generating programmed logic circuitry including copy generating programmed logic circuitry that enables a player to generate a duplicate character copy of said player character at one or more particular creating locations of said duplicating block based on said player character being superposed over a selected creating position of said duplicating block by a player manipulating said operating control;
duplicate character display programmed logic circuitry that displays said duplicate character copy arranged in a positional association with said player character on said display in a manner that preserves a relative spatial positional relationship existing between said player character and said duplicate character copy when said duplicate character copy is generated;
duplicate character formation moving programmed logic circuitry that enables a player to move a plurality of duplicate characters together as a group in response to a manipulation of said operating control device, said group forming an arrangement pattern of duplicate characters, to superpose on the displayed puzzle image on the display while maintaining the relative spatial positional relationship on the display between each of the plurality of duplicate characters within the group;
puzzle solution determining programmed logic circuitry that determines whether or not an arrangement pattern of said duplicate characters satisfies the puzzle indicated by said puzzle image; and
progress changing programmed logic circuitry that changes the progress of the game when it is determined that said puzzle is satisfied by said puzzle solution determining programmed logic circuitry, wherein said copy generating programmed logic circuitry generates, based on at least said player character being superposed on a predetermined number of creating positions, said copy in the superposed creating positions so as to be displayed on said display.

2. A puzzle game apparatus according to claim 1, wherein said duplicate character display programmed logic circuitry causes the displayed duplicate character to disappear when a display time of the duplicate character exceeds a predetermined time period.

3. A puzzle game apparatus according to claim 1, wherein said copy generating programmed logic circuitry generates, when a predetermined input is present from said at least one operating control in a state that said player character is superposed on said creating position, said copy in the superposed creating position so as to be displayed on said display.

4. A storage medium storing a puzzle game program that causes a game apparatus provided with at least one operating control for use by a player in performing a game operation and a display that displays a game image to function as a puzzle game apparatus, said puzzle game program causes a processor of said game apparatus to execute the following steps of:
displaying a player character to be operated by the player on said display in response to an input from said at least one operating control;
displaying a puzzle image indicative of a puzzle to be solved on said display;
displaying a player character duplicating block having a plurality of duplicate character creating locations arranged in a predetermined form on said display;
generating a duplicate character as a copy of a player character existing in a predetermined position within a game field, said duplicate character copy generated at one or more particular creating locations of said duplicating block based on said player character being superposed over a selected creating position of said duplicating block in response to a manipulation of said operating control;
displaying said duplicate character copy arranged in a positional association with said player character on said display in a manner that preserves a relative spatial positional relationship existing between said player character and said duplicate character when said duplicate character copy is generated;

moving a plurality of duplicate characters together as a group in response to a manipulation of said operating control while maintaining the relative spatial positional relationship on the display between each of the plurality of duplicate characters within the group, said group forming a particular arrangement pattern of duplicate characters;

determining whether or not an arrangement pattern of said duplicate characters satisfies the puzzle indicated by said puzzle image when moved into a superposed position on the displayed puzzle image; and changing the progress of the game when it is determined that said puzzle is satisfied by said determining.

5. A storage medium storing a puzzle game program according to claim 4, wherein said displaying said duplicate character causes the displayed duplicate character to disappear when a display time of the duplicate character exceeds a predetermined time period.

6. A storage medium storing a puzzle game program according to claim 4, wherein said generating a copy generates, when a predetermined input is present from said at least one operating control in a state that said player character is superposed on said creating position, generating a duplicate character copy that is displayed at the superposed creating position so as to be displayed on said display.

7. A storage medium storing a puzzle game program according to claim 4, wherein based at least on said player character being superposed on a predetermined number of creating positions, generating a duplicate character copy that is displayed at each of the superposed creating positions on said display.

8. A method of controlling a game apparatus for providing a puzzle game, said game apparatus having at least one operating control for player use in performing a game operation and a display that displays a game image, comprising:

displaying a player character to be operated by the player on said display in response to an input from said at least one operating control;

displaying a puzzle image indicative of a puzzle to be solved on said display;

displaying a player character duplicating block having a plurality of duplicate character creating locations arranged in a predetermined form on said display;

generating a duplicate character as a copy of a player character existing in a predetermined position within a game field, said duplicate character copy generated at one or more particular creating locations of said duplicating block based on said player character being superposed over a selected creating position of said duplicating block in response to a manipulation of said operating control;

displaying said duplicate character copy arranged in a positional association with said player character on said display in a manner that preserves a relative spatial positional relationship existing between said player character and said duplicate character when said duplicate character copy is generated;

moving a plurality of duplicate characters together as a group in response to a manipulation of said operating control while maintaining the relative spatial positional relationship on the display between each of the plurality of duplicate characters within the group, said group forming a particular arrangement pattern of duplicate characters;

determining whether or not an arrangement pattern of said duplicate characters satisfies the puzzle indicated by said puzzle image when moved into a superposed position on the displayed puzzle image; and changing the progress of the game when it is determined that said puzzle is satisfied by said determining.

9. A method of providing a game for playing on a game apparatus provided with at least one operation control and a display for displaying and controlling objects displayed in the game, comprising:

displaying a puzzle to be solved;

displaying at least a player controllable game object;

moving at least the player controllable object within the display in response to a player input to the at least one operation control;

displaying at least one duplicating block having at least one duplicating position designated as a position where a player controllable object may be duplicated;

duplicating the player controllable object based on at least in response to the player controllable object being superposed on at least one duplicating position of the at least one duplicating block;

moving a plurality of duplicated objects together as a group in response to a manipulation of said operation control while maintaining the relative spatial positional relationship on the display between each of the plurality of duplicated objects within the group, said group forming a particular arrangement pattern of duplicated objects; and determining whether a superposed position of a particular arrangement pattern upon the displayed puzzle solves the puzzle.

10. The method of claim 9, wherein duplicating further comprises duplicating the player controllable object in response to the player controllable object being superposed on at least one duplicating position of the at least one duplicating block and a predetermined input produced by a player manipulating the at least one operation control.

11. The method of claim 9, wherein duplicating further comprises duplicating the player controllable object in response to the player controllable object having been superposed on at least a predetermined number of different duplicating positions of the at least one duplicating block.

12. The method of claim 11, wherein a duplicate object is created at duplicating positions on which the player controllable object is or was previously superposed.

13. The method of claim 9, wherein only a predetermined number of duplicate objects are permitted to be made and moving a plurality of duplicated objects together as a group is enabled only after all of said predetermined number of duplicate objects have been made.

14. The method of claim 9, wherein a player indicates that a desired number of duplicate objects have been made by an input to the at least one operation control and moving a plurality of duplicated objects together as a group is enabled only after all duplicate objects desired to be made have been made.

* * * * *